United States Patent
Okamoto et al.

(10) Patent No.: US 10,454,394 B2
(45) Date of Patent: *Oct. 22, 2019

(54) ROTATIONAL DRIVING FORCE IMPARTING DEVICE AND ELECTRIC MOTOR DEVICE FOR THE SAME

(71) Applicant: MITSUBISHI HEAVY INDUSTRIES COMPRESSOR CORPORATION, Tokyo (JP)

(72) Inventors: Yoshiyuki Okamoto, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 303 days.

This patent is subject to a terminal disclaimer.

(21) Appl. No.: 15/325,927

(22) PCT Filed: Jul. 18, 2014

(86) PCT No.: PCT/JP2014/069253
§ 371 (c)(1),
(2) Date: Jan. 12, 2017

(87) PCT Pub. No.: WO2016/009564
PCT Pub. Date: Jan. 21, 2016

(65) Prior Publication Data
US 2017/0170755 A1    Jun. 15, 2017

(51) Int. Cl.
*H02P 5/747* (2006.01)
*H02P 6/04* (2016.01)
(Continued)

(52) U.S. Cl.
CPC ............ *H02P 5/747* (2013.01); *F16H 3/724* (2013.01); *H02K 7/003* (2013.01); *H02K 7/116* (2013.01);
(Continued)

(58) Field of Classification Search
CPC . F16H 3/724; F16H 63/50; H02P 5/00; H02P 5/46; H02P 5/747; H02K 7/003;
(Continued)

(56) References Cited

U.S. PATENT DOCUMENTS 2,578,015 A    12/1951 Reinhard
2,916,642 A    12/1959 Macks
(Continued)

FOREIGN PATENT DOCUMENTS

DE    1 963 220 A1    7/1970
DE    2 236 588 A1    2/1974
(Continued)

OTHER PUBLICATIONS

Written Opinion of the International Searching Authority and International Search Report (forms PCT/ISA/237 and PCT/ISA/210), dated May 19, 2015, for International Application No. PCT/JP2015/055064, with English translations.
(Continued)

*Primary Examiner* — Huan Le
(74) *Attorney, Agent, or Firm* — Birch, Stewart, Kolasch & Birch, LLP

(57) ABSTRACT

A rotational driving force imparting device includes an electric motor device and a planetary gear transmission device. Among a sun gear shaft of a planetary gear transmission device, a planetary gear carrier shaft, and an internal gear carrier shaft, one shaft forms an output shaft, another shaft forms a constant speed input shaft, and the other shaft forms a variable speed input shaft. The electric motor device includes a constant speed motor including a constant speed rotor that rotates about a shaft line and is connected to a constant speed input shaft, and a variable speed motor including a variable speed rotor that rotates about the shaft line and is connected to a variable speed input shaft. A shaft
(Continued)

insertion hole forming a cylindrical shape about the shaft line and penetrating in the axial direction is formed in the variable speed rotor, and the constant speed rotor is inserted into the shaft insertion hole.

13 Claims, 7 Drawing Sheets

(51) Int. Cl.
    *H02P 6/10*     (2006.01)
    *H02K 7/116*     (2006.01)
    *H02K 9/06*     (2006.01)
    *H02P 5/46*     (2006.01)
    *F16H 3/72*     (2006.01)
    *H02K 7/00*     (2006.01)
    *H02K 16/00*     (2006.01)

(52) U.S. Cl.
    CPC ............... *H02K 9/06* (2013.01); *H02K 16/00* (2013.01); *H02P 5/46* (2013.01); *H02P 6/04* (2013.01); *H02P 6/10* (2013.01)

(58) Field of Classification Search
    CPC .......... H02K 7/116; H02K 7/14; H02K 16/00; H02K 17/02
    See application file for complete search history.

(56) References Cited

U.S. PATENT DOCUMENTS

| | | | |
|---|---|---|---|
| 3,575,805 A | 4/1971 | Dempsey | |
| 5,062,824 A | 11/1991 | Prokopius | |
| 5,090,261 A | 2/1992 | Nakatsukasa | |
| 5,947,854 A | 9/1999 | Kopko | |
| 6,358,172 B1 | 3/2002 | Hiegemann | |
| 6,555,927 B1 | 4/2003 | Suzuki et al. | |
| 6,808,468 B1 | 10/2004 | Miyazaki et al. | |
| 7,207,919 B2 | 4/2007 | Tsuneyoshi et al. | |
| 7,322,891 B1 | 1/2008 | Prewitt et al. | |
| 7,609,011 B2 | 10/2009 | Yatabe et al. | |
| 10,177,692 B2 * | 1/2019 | Kobayashi | H02K 7/116 |
| 2003/0064847 A1 * | 4/2003 | Oshidari | B60K 6/365 475/5 |
| 2006/0019756 A1 | 1/2006 | Lattin | |
| 2006/0264296 A1 | 11/2006 | Moeller | |
| 2007/0155570 A1 * | 7/2007 | Kimura | F16H 3/724 475/153 |
| 2007/0191169 A1 | 8/2007 | Fujita et al. | |
| 2009/0010094 A1 | 1/2009 | Uemura | |
| 2013/0249444 A1 | 9/2013 | Golding | |
| 2014/0194214 A1 | 7/2014 | Maeda | |
| 2017/0141706 A1 | 5/2017 | Kobayashi et al. | |
| 2017/0155345 A1 * | 6/2017 | Kobayashi | H02K 7/116 |

FOREIGN PATENT DOCUMENTS

| | | |
|---|---|---|
| DE | 197 51 231 A1 | 6/1999 |
| EP | 1 961 602 A1 | 8/2008 |
| FR | 822746 A | 1/1938 |
| FR | 2 094 518 A5 | 2/1972 |
| GB | 407760 | 3/1934 |
| JP | 59-70497 A | 4/1984 |
| JP | 1-176247 U | 12/1989 |
| JP | 3-73745 U | 7/1991 |
| JP | 7-135701 A | 5/1995 |
| JP | 2000-324607 A | 11/2000 |
| JP | 2001-152901 A | 6/2001 |
| JP | 2003-34153 A | 2/2003 |
| JP | 2004-116542 A | 4/2004 |
| JP | 2004-150609 A | 5/2004 |
| JP | 2005-153727 A | 6/2005 |
| JP | 2006-38228 A | 2/2006 |
| JP | 2006-521517 A | 9/2006 |
| JP | 4183481 B2 | 11/2008 |
| JP | 4472350 B2 | 6/2010 |
| JP | 2010-242811 A | 10/2010 |
| JP | 2014-87170 A | 5/2014 |
| WO | WO 01/85483 A1 | 11/2001 |
| WO | WO 03/071160 A1 | 8/2003 |
| WO | WO 2013/035172 A1 | 3/2013 |
| WO | WO 2016/009668 A1 | 1/2016 |
| WO | WO 2016/010146 A1 | 1/2016 |

OTHER PUBLICATIONS

Written Opinion of the International Searching Authority and International Search Report (forms PCT/ISA/237 and PCT/ISA/210), dated Sep. 22, 2014, for International Application No. PCT/JP2014/069253, with English translations.

Written Opinion of the International Searching Authority and International Search Report (forms PCT/ISA/237 and PCT/ISA/210), dated Sep. 29, 2015, for International Application No. PCT/JP2015/070580, with English translations.

* cited by examiner

ROTATIONAL DRIVING FORCE IMPARTING DEVICE AND ELECTRIC MOTOR DEVICE FOR THE SAME

TECHNICAL FIELD

The present invention relates to a rotational driving force imparting device that imparts a rotational driving force to a driving target, and an electric motor device for the same.

BACKGROUND ART

A rotational driving force imparting device includes an electric motor device that generates a rotational driving force, and a transmission device that changes the rotational driving force generated in the electric motor device and transmits the changed rotational driving force to the driving target.

Patent Document 1 below discloses the rotational driving force imparting device as described above. The transmission device of the rotational driving force imparting device is a planetary gear transmission device. This transmission device includes a sun gear that rotates about a shaft line, a plurality of planetary gears that revolve about the shaft line in engagement with the sun gear and rotate about their own center line, an arm or a carrier that supports the plurality of planetary gears, and an internal gear in which a plurality of teeth are aligned annularly about the shaft line and are engaged with the planetary gears. An arm shaft extending in an axial direction about a shaft line is fixed to the arm. This arm shaft forms an output shaft that is connected to a driving target.

The electric motor device of this rotational driving force imparting device includes an auxiliary motor that rotates the sun gear about the shaft line, a transfer mechanism that transfers a rotational driving force of the auxiliary motor to the sun gear, a main motor that rotates the internal gear about the shaft line, and a transfer mechanism that transfers a rotational driving force of the main motor to the internal gear. A rotor shaft of the auxiliary motor and a rotor shaft of the main motor are both arranged at a position to the shaft line of the transmission device and separate in the radial direction from the shaft line. Each transfer mechanism includes a belt and a pulley.

In this rotational driving force imparting device, a rotational speedrotational speed of an output shaft connected to a driving target can be changed by changing a rotational speedrotational speed of the auxiliary motor.

CITATION LIST

Patent Literature

[Patent Literature 1]
Japanese Unexamined Patent Application, First Publication No. Sho 59-070497

SUMMARY OF INVENTION

Technical Problem

Since the rotational driving force imparting device described in Patent Document 1 includes two motors arranged at positions radially away from the shaft line of the transmission device, there is a problem in that the device is large as a whole. Further, in this rotational driving force imparting device, since the two motors are arranged at positions radially away from the shaft line of the transmission device, there is another problem in that it is necessary for a transfer mechanism having a belt, a pulley, or the like to be provided in the two motors, the device is complicated, and manufacturing costs are higher.

Accordingly, an object of the present invention is to provide a rotational driving force imparting device in which miniaturization and reduction of manufacturing costs are able to be achieved, and an electric motor device for the same.

Solution to Problem

A rotational driving force imparting device as an aspect according to an invention for solving the above problems includes an electric motor device configured to generate a rotational driving force; and a transmission device configured to transmit the rotational driving force generated by the electric motor device to a driving target and change a rotational speed, the transmission device including a sun gear that rotates about a shaft line; a sun gear shaft that is fixed to the sun gear and extends in an axial direction about the shaft line; a planetary gear that is engaged with the sun gear, revolves about the shaft line, and rotates about its own center line; an internal gear in which a plurality of teeth are annularly aligned about the shaft line and are engaged with the planetary gear; a planetary gear carrier that includes a planetary gear carrier shaft extending in the axial direction about the shaft line, and supports the planetary gear so that the planetary gear is revolvable about the shaft line and rotatable about a center line of the planetary gear; and an internal gear carrier that includes an internal gear carrier shaft extending in an axial direction about the shaft line and supports the internal gear so that the internal gear is rotatable about the shaft line, any one of the sun gear shaft, the planetary gear carrier shaft, and the internal gear carrier shaft form an output shaft that is connected to the driving target, another shaft forms a constant speed input shaft, and the other shaft forms a variable speed input shaft, the electric motor device including a constant speed motor including a constant speed rotor that rotates about the shaft line and is directly or indirectly connected to the constant speed input shaft of the transmission device; and a variable speed motor including a variable speed rotor that rotates about the shaft line and is directly or indirectly connected to the variable speed input shaft of the transmission device, a shaft insertion hole forming a cylindrical shape about the shaft line and penetrating in the axial direction is formed in a first rotor among the constant speed rotor and the variable speed rotor, and a second rotor is inserted into the shaft insertion hole of the first rotor.

In the rotational driving force imparting device, since the constant speed rotor of the constant speed motor and the variable speed rotor of the variable speed motor are arranged on the shaft line of the transmission device, it is possible to achieve miniaturization as a whole, unlike in a case in which the constant speed rotor and the variable speed rotor are arranged at positions away from the shaft line of the transmission device in the radial direction. Further, in the rotational driving force imparting device, since it is not necessary to provide a transfer mechanism such as a belt or a pulley unlike a case in which the constant speed rotor and the variable speed rotor are arranged at a position separate in the radial direction from the shaft line of the transmission device, it is possible to achieve miniaturization of the device from this point of view and reduction of a manufacturing cost due to a reduced number of parts. Further, in the rotational driving force imparting device, a bending load is not applied from the belt or the like to a shaft located on the shaft line of the transmission device, and it is possible to also achieve a reduction of vibration since it is not necessary to provide a transfer mechanism such as a belt or a pulley, as described.

Here, the rotational driving force imparting device may include: a constant speed flexible coupling that connects the constant speed rotor to the constant speed input shaft; and a variable speed flexible coupling that connects the variable speed rotor to the variable speed input shaft.

In the rotational driving force imparting device, it is possible to allow eccentricity, angular deflection, and vibration between the constant speed rotor of the electric motor device and the constant speed input shaft of the transmission device using the constant speed flexible coupling. Further, in the rotational driving force imparting device, it is possible to allow eccentricity, angular deflection, and vibration between the variable speed rotor of the electric motor device and the variable speed input shaft of the transmission device using the variable speed flexible coupling. Therefore, in the rotational driving force imparting device, it is possible to minimize time and effort of work of centering the transmission device on the electric motor device, and to suppress transfer of shaft vibration from the electric motor device to the transmission device and transfer of shaft vibration from the transmission device to the electric motor device.

Further, in the rotational driving force imparting device including the constant speed flexible coupling and the variable speed flexible coupling, the flexible coupling connected to the first rotor among the constant speed flexible coupling and the variable speed flexible coupling forms a first flexible coupling, an input shaft that is rotated with rotation of the first rotor among the constant speed input shaft and the variable speed input shaft forms a first input shaft, a rotor-side connection portion that forms an annular shape about the shaft line and is connected to the first flexible coupling is formed in an end portion of the first rotor on the transmission device side, and a transmission device-side connection portion that forms an annular shape about the shaft line and is connected to the first flexible coupling to be opposite to the rotor-side connection portion in the axial direction is formed at an end portion of the first input shaft on the electric motor device side.

In the rotational driving force imparting device, the rotor-side connection portion of the first rotor arranged on the outer circumferential side of the second rotor and the transmission device-side connection portion of the first input shaft connected to the first rotor via the first flexible coupling face in the axial direction. Therefore, for the first flexible coupling, a general, in other words, general-purpose flexible coupling can be adopted.

Further, in any one of the rotational driving force imparting devices each including the constant speed flexible coupling and the variable speed flexible coupling, the flexible coupling connected to the first rotor among the constant speed flexible coupling and the variable speed flexible coupling forms a first flexible coupling, and the flexible coupling connected to the second rotor forms a second flexible coupling, the first flexible coupling is arranged on the outer circumferential side of the second flexible coupling with respect to the shaft line, and a length in an axial direction of the second flexible coupling is equal to or smaller than a length in an axial direction of the first flexible coupling.

In the rotational driving force imparting device, since the second flexible coupling is arranged on the inner circumferential side of the first flexible coupling, but the length in an axial direction of the second flexible coupling is equal to or smaller than the length in an axial direction of the first flexible coupling, it is possible to easily perform work for attaching each flexible coupling.

Further, in any one of the rotational driving force imparting devices, the constant speed motor may include a constant speed stator arranged on an outer circumferential side of the constant speed rotor, and a constant speed motor casing in which the constant speed stator is fixed to an inner circumferential side thereof, the variable speed motor may include a variable speed stator arranged on an outer circumferential side of the variable speed rotor, and a variable speed motor casing in which the variable speed stator is fixed to an inner circumferential side thereof, and the variable speed motor casing may be fixed to the constant speed motor casing.

In the rotational driving force imparting device, the variable speed motor casing is fixed to the constant speed motor casing. Therefore, in the rotational driving force imparting device, it is possible to accurately perform positioning (centering) of the variable speed rotor with respect to the constant speed rotor prior to shipment from a manufacturing factory of the rotational driving force imparting device. Thus, in the rotational driving force imparting device, it is possible to omit work for positioning the variable speed rotor with respect to the constant speed rotor at an installation site.

The rotational driving force imparting device in which the variable speed motor casing is fixed to the constant speed motor casing may include a cooling fan attached to an end portion of the second rotor opposite to the transmission device, wherein the constant speed motor casing and the variable speed motor casing communicate with each other so that gas flow occurs due to rotation of the cooling fan in the constant speed motor casing and the variable speed motor casing.

In the rotational driving force imparting device, when the second rotor rotates, the cooling fan provided on an end of the second rotor also rotates. Due to the rotation of the cooling fan, external air flows into one of the constant speed motor casing and the variable speed motor casing to cool the rotor, the stator or the like in one housing. Further, in the rotational driving force imparting device, since the constant speed motor casing and the variable speed motor casing communicate with each other, the air flowing into the one casing also flows into the other casing to cool the rotor, the stator or the like in the other housing. Therefore, in the rotational driving force imparting device, it is possible to cool the two motors using one cooling fan and, from this point of view, it is possible to achieve miniaturization and reduction in a manufacturing cost of the device.

Further, any one of the rotational driving force imparting devices may include a frequency conversion device that changes a frequency of power that is supplied to the variable speed motor; a first switch that causes the constant speed motor to enter a power supply state and a power disconnection state; a second switch that causes the variable speed motor to enter a power supply state and a power disconnection state; and a controller that instructs a frequency of power that is supplied to the variable speed motor to the frequency conversion device and instructs the first switch and the second switch to be turned ON or OFF.

In the rotational driving force imparting device, it is possible to control the driving and stopping of the constant speed motor and the variable speed motor, and to control a rotational speed of the variable speed motor.

In the rotational driving force imparting device including the controller, the sun gear shaft may form the output shaft, the planetary gear carrier shaft may form the variable speed input shaft, and the internal gear carrier shaft may form the constant speed input shaft, and when the controller receives a startup instruction, the controller may instruct the second switch to be turned ON so that the variable speed motor enters the power supply state, instruct a predetermined minimum frequency to the frequency conversion device so that the variable speed motor begins to be driven with a minimum rotational speed, and then, instruct the first switch to be turned ON so that the constant speed motor enters the power supply state.

In the rotational driving force imparting device, a rotational speed of the output shaft when only the variable speed motor is rotated at the minimum rotational speed becomes a lower number of rotations than a range of a rotational speed of the output shaft when the constant speed motor and the variable speed motor both rotate. Therefore, in the rotational driving force imparting device, at the time of startup, only the variable speed motor is rotated at the minimum rotational speed to rotate the output shaft, and a startup load torque of the electric motor device is reduced.

Further, a rotational driving force imparting device according to an aspect according to another invention includes: a transmission device including an output shaft that is connected to a driving target, a constant speed input shaft that rotates at a constant speed, and a variable speed input shaft that rotates at variable speed, a rotational speed of the output shaft being determined according to a rotational speed of the variable speed input shaft and a rotational speed of the constant speed input shaft; an electric motor device including a constant speed motor that rotates and drives the constant speed input shaft, and a variable speed motor that rotates and drives the variable speed input shaft; a frequency conversion device that changes a frequency of power that is supplied to the variable speed motor; a first switch that causes the constant speed motor to enter a power supply state and a power disconnection state; a second switch that causes the variable speed motor to enter a power supply state and a power disconnection state; and a controller that instructs a frequency of power that is supplied to the variable speed motor to the frequency conversion device and instructs the first switch and the second switch to be turned ON or OFF, the transmission device including a sun gear that rotates about a shaft line; a sun gear shaft that is fixed to the sun gear and extends in an axial direction about the shaft line; a planetary gear that is engaged with the sun gear, revolves about the shaft line, and rotates about its own center line; an internal gear in which a plurality of teeth are annularly aligned about the shaft line and are engaged with the planetary gear; a planetary gear carrier that includes a planetary gear carrier shaft extending in the axial direction about the shaft line, and supports the planetary gear so that the planetary gear is revolvable about the shaft line and rotatable about a center line of the planetary gear; and an internal gear carrier that includes an internal gear carrier shaft extending in an axial direction about the shaft line and supports the internal gear so that the internal gear is rotatable about the shaft line, the sun gear shaft forms the output shaft, the planetary gear carrier shaft forms the variable speed input shaft, and the internal gear carrier shaft forms the constant speed input shaft, and when the controller receives a startup instruction, the controller instructs the second switch to be turned ON so that the variable speed motor enters the power supply state, instructs a predetermined minimum frequency to the frequency conversion device so that the variable speed motor begins to be driven with a minimum rotational speed, and then, instructs the first switch to be turned ON so that the constant speed motor enters the power supply state.

In the rotational driving force imparting device, it is possible to control the driving and stopping of the constant speed motor and the variable speed motor, and to control a rotational speed of the variable speed motor. Incidentally, in the rotational driving force imparting device, a rotational speed of the output shaft when only the variable speed motor is rotated at the minimum rotational speed becomes a smaller rotational speed than a range of a rotational speed of the output shaft when the constant speed motor and the variable speed motor both rotate. Therefore, in the rotational driving force imparting device, at the time of startup, only the variable speed motor is rotated at the minimum rotational speed to rotate the output shaft, and a startup load torque of the electric motor device is reduced.

In any one of the rotational driving force application devices each including the controller, the frequency conversion device is a reversible frequency conversion device capable of changing a direction of a current that is supplied to the variable speed motor, and the controller realizes a determination step of determining whether it is necessary to change the direction of the current that is supplied to the variable speed motor in order to realize a rotational speed after a rotational speed of the output shaft is changed when a change of a rotational speed of the output shaft is received; a switch OFF instruction step of instructing the second switch to be turned OFF to cause the variable speed motor to enter the power disconnection state when it is determined that it is necessary to change the direction of the current that is supplied to the variable speed motor; a switch ON and current direction change instruction step of instructing the second switch to be turned ON to cause the variable speed motor to enter the power supply state and instructing the frequency conversion device to change the direction of the current that is supplied to the variable speed motor after the variable speed motor enters the power disconnection state; and a target frequency instruction step of instructing a frequency necessary to realize a rotational speed after the change of a rotational speed of the output shaft as a frequency of the power that is supplied to the variable speed motor after the variable speed motor begins to be reversely rotated and driven due to the change of the direction of the current that is supplied to the variable speed motor.

In the rotational driving force imparting device, when the direction of the current that is supplied to the variable speed motor is changed to change the direction of the rotation of the variable speed motor, the power that is supplied to the variable speed motor is first disconnected to stop the generation of rotational driving force from the variable speed motor. In the rotational driving force imparting device, the direction of the current that is supplied to the variable speed motor is then changed to supply the power to the variable speed motor and rotate and drive the variable speed motor. Therefore, in the rotational driving force imparting device, when the direction of the current that is supplied to the variable speed motor is changed, it is possible to reduce a sudden load on the variable speed motor.

Further, in the rotational driving force imparting device in which the frequency conversion device is a reversible frequency conversion device, the transmission device includes a brake that restrains the variable speed input shaft so that the variable speed input shaft is not rotatable, and the controller executes a brake operation instruction step of instructing the brake to restrain the variable speed input shaft after the variable speed motor enters the power disconnection state due to execution of the switch OFF instruction step, and then instructing the brake to release of the restraint of the variable speed input shaft before reversely rotating and driving the variable speed motor.

In the rotational driving force imparting device, when the direction of the current that is supplied to the variable speed motor is changed to change the direction of the rotation of the variable speed motor, the power that is supplied to the variable speed motor is once disconnected to stop the generation of rotational driving force from the variable speed motor. In the rotational driving force imparting device, the variable speed input shaft is restrained by the brake so that the variable speed input shaft is not rotatable, and the variable speed motor is stopped. In the rotational driving force imparting device, the direction of the current that is supplied to the variable speed motor is then changed to supply the power to the variable speed motor and rotate and drive the variable speed motor. Therefore, in the rotational driving force imparting device, when the direction of the current that is supplied to the variable speed motor is changed, it is possible to further reduce a sudden load on the variable speed motor.

Further, in any one of the rotational driving force imparting devices in which the frequency conversion device is a reversible frequency conversion device, the controller may execute a first minimum frequency instruction step of instructing a predetermined minimum frequency to the frequency conversion device as a frequency of the power to be supplied to the variable speed motor before execution of the switching OFF instruction step when it is determined in the determination step that it is necessary to change the direction of the current that is supplied to the variable speed motor; and a second minimum frequency instruction process of instructing the minimum frequency as a frequency of the power that is supplied to the variable speed motor after the variable speed motor enters the power disconnected state due to execution of the switch OFF instruction process and before the target frequency instruction process is executed.

In the rotational driving force imparting device, when the direction of the current that is supplied to the variable speed motor is changed to change the direction of the rotation of the variable speed motor, the power that is supplied to the variable speed motor is once disconnected to stop the generation of rotational driving force from the variable speed motor after the variable speed motor rotates at the minimum rotational speed. In the rotational driving force imparting device, the direction of the current that is supplied to the variable speed motor is then changed to supply the power at a minimum frequency to the variable speed motor and rotate and drive the variable speed motor at the minimum rotational speed. Therefore, in the rotational driving force imparting device, when the direction of the current that is supplied to the variable speed motor is changed, it is possible to further reduce a sudden load on the variable speed motor.

In any one of the rotational driving force imparting devices, the sun gear shaft may form the output shaft, the planetary gear carrier shaft may form the variable speed input shaft, and the internal gear carrier shaft may form the constant speed input shaft.

In the rotational driving force imparting device, it is possible to increase a rotational speed of the output shaft relative to a rotational speed of the constant speed input shaft.

In any one of the rotational driving force imparting devices, the number of poles of the variable speed motor may be greater than the number of poles of the constant speed motor.

An electric motor device as an aspect according to the invention for solving the above problems is an electric motor device connected to a transmission device including an output shaft that is connected to a driving target, a constant speed input shaft that rotates at a constant speed, and a variable speed input shaft that rotates at variable speed, a rotational speed of the output shaft being determined according to a rotational speed of the variable speed input shaft and a rotational speed of the constant speed input shaft, the electric motor device including: a constant speed motor that rotates and drives the constant speed input shaft, and a variable speed motor that rotates and drives the variable speed input shaft, the constant speed motor includes a constant speed rotor that rotates about the shaft line and is directly or indirectly connected to the constant speed input shaft of the transmission device, a constant speed stator arranged on an outer circumferential side of the constant speed rotor, and a constant speed motor casing in which the constant speed stator is fixed to an inner circumferential side thereof, the variable speed motor includes a variable speed rotor that rotates about the shaft line and is directly or indirectly connected to the variable speed input shaft of the transmission device, a variable speed stator arranged on an outer circumferential side of the variable speed rotor, and a variable speed motor casing in which the variable speed stator is fixed to an inner circumferential side thereof, a shaft insertion hole forming a cylindrical shape about the shaft line and penetrating in the axial direction is formed in a first rotor among the variable speed rotor and the constant speed rotor, and a second rotor is inserted into the shaft insertion hole of the first rotor, and the variable speed motor casing is fixed to the constant speed motor casing.

In the electric motor device, since the constant speed rotor of the constant speed motor and the variable speed rotor of the variable speed motor are arranged on the same shaft line, it is possible to achieve miniaturization as a whole, unlike a case in which the constant speed rotor and the variable speed rotor are arranged at a position separate in the radial direction from the shaft line. Further, in the electric motor device, since it is not necessary to provide a transfer mechanism such as a belt or a pulley unlike a case in which the constant speed rotor and the variable speed rotor are arranged at a position separate in the radial direction from the shaft line, it is possible to achieve miniaturization of the device from this point of view and reduction of a manufacturing cost due to a reduced number of parts. Further, in the electric motor device, a bending load is not applied from the belt or the like to a shaft located on the shaft line, and it is possible to also achieve a reduction of vibration since it is not necessary to provide a transfer mechanism such as a belt or a pulley, as described.

Further, in the electric motor device, the variable speed motor casing is fixed to the constant speed motor casing. Therefore, in the electric motor device, it is possible to accurately perform positioning (centering) of the variable speed rotor with respect to the constant speed rotor prior to shipment from a manufacturing factory of the electric motor device. Thus, in the electric motor device, it is possible to omit work for positioning the variable speed rotor with respect to the constant speed rotor at an installation site.

Further, the electric motor device may include a cooling fan attached to an end portion of the second rotor opposite to the transmission device, and the constant speed motor casing and the variable speed motor casing may communicate with each other so that gas flow occurs due to rotation of the cooling fan in the constant speed motor casing and the variable speed motor casing.

In the electric motor device, when the second rotor rotates, the cooling fan provided on an end of the second rotor also rotates. Due to the rotation of the cooling fan, external air flows into one of the constant speed motor casing and the variable speed motor casing to cool the rotor, the stator or the like in one housing. Further, in the electric motor device, since the constant speed motor casing and the variable speed motor casing communicate with each other, the air flowing into the one casing also flows into the other casing to cool the rotor, the stator or the like in the other housing. Therefore, in the electric motor device, it is possible to cool the two motors using one cooling fan and, from this point of view, it is possible to achieve miniaturization and reduction in a manufacturing cost.

Advantageous Effects of Invention

In one aspect of the present invention, it is possible to achieve miniaturization and reduction in a manufacturing cost of the device.

DESCRIPTION OF EMBODIMENTS

Hereinafter, various embodiments and various modification examples of a rotational driving force imparting device according to the present invention will be described in detail with reference to the accompanying drawings.

<First Embodiment>

A first embodiment of the rotational driving force imparting device according to the present invention will be described with reference to FIGS. 1 to 5.

Figure 1:
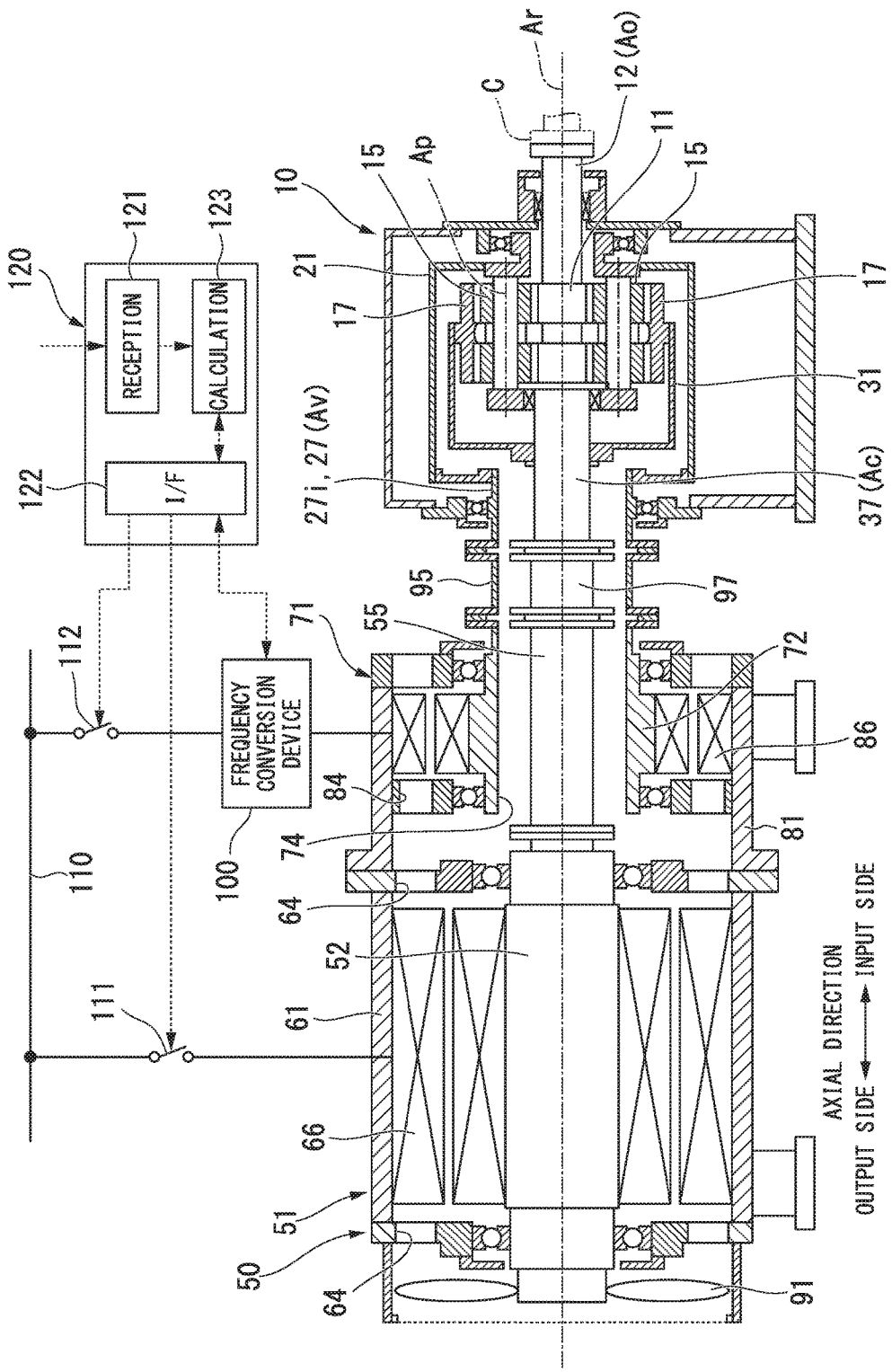
FIG. 1 is a cross-sectional view of a rotational driving force imparting device in a first embodiment according to the present invention.

The rotational driving force imparting device of this embodiment includes an electric motor device 50 that generates a rotational driving force, and a transmission device 10 that changes the rotational driving force generated by the electric motor device 50 and transmits the changed rotational driving force to a driving target, as illustrated in FIG. 1.

Figure 2:
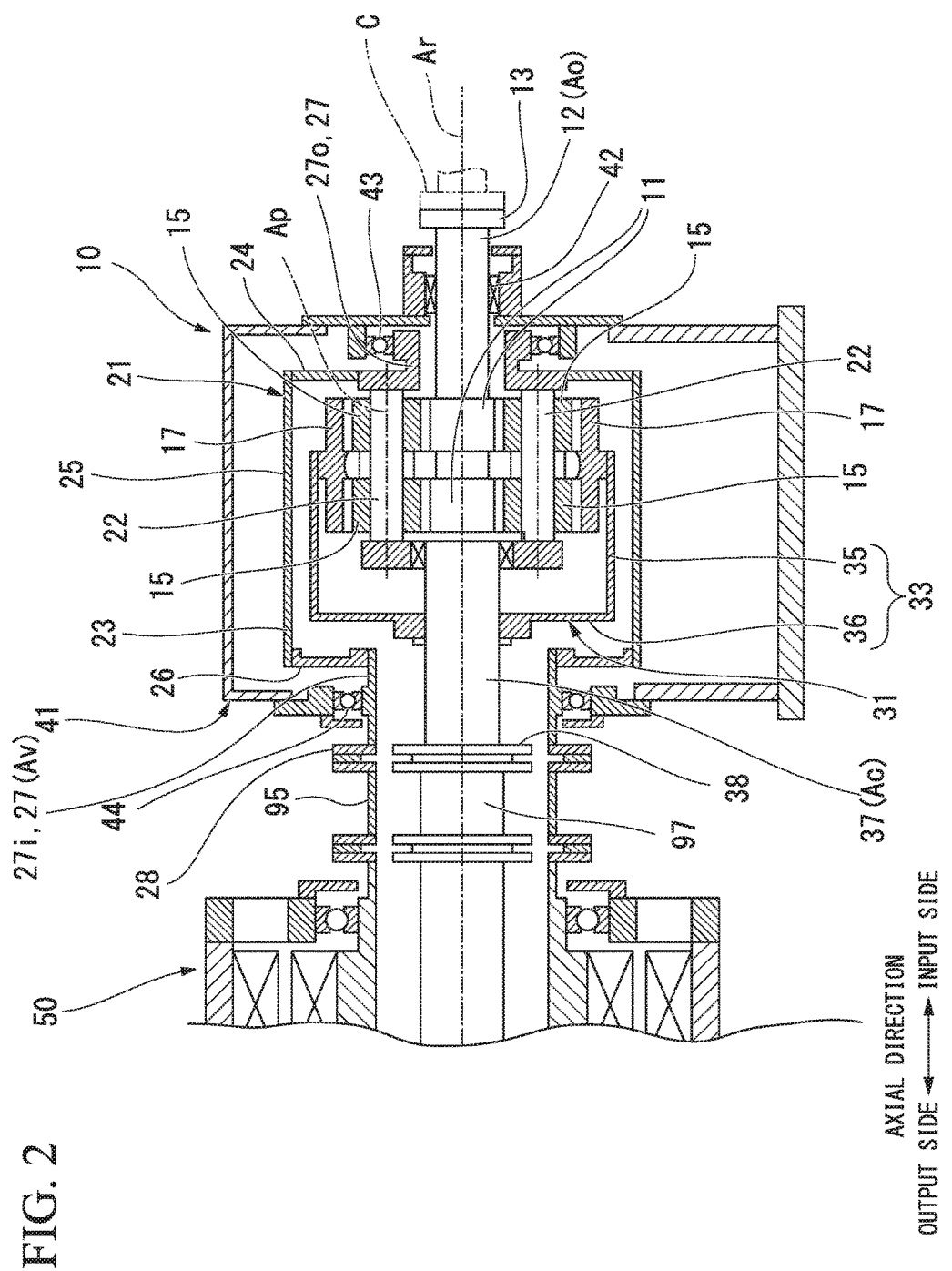
FIG. 2 is a cross-sectional view of a transmission device in the first embodiment according to the present invention.

The transmission device 10 is a planetary gear transmission device. The transmission device 10 includes a sun gear 11 that rotates about a shaft line Ar, a sun gear shaft 12 that is fixed to the sun gear 11, a plurality of planetary gears 15 that are engaged with the sun gear 11, revolve about the shaft line Ar, and rotate about their own center line Ap, an internal gear 17 in which a plurality of teeth are annularly aligned about the shaft line Ar and engaged with a plurality of planetary gears 15, a planetary gear carrier 21 that supports the plurality of planetary gears 15 so that the planetary gears 15 are revolvable about the shaft line Ar and rotatable about the center line Ap of the planetary gear 15, an internal gear carrier 31 that supports the internal gear 17 so that the internal gear 17 is rotatable about the shaft line Ar, and a transmission casing 41 that covers these, as illustrated in FIG. 2.

Here, a direction in which the shaft line Ar extends is an axial direction, one side in the axial direction is an output side, and a side opposite to the output side is an input side. Further, hereinafter, a radial direction about the shaft line Ar is simply referred to as a radial direction.

The sun gear shaft 12 forms a columnar shape about the shaft line Ar and extends from the sun gear 11 to the output side in the axial direction. A flange 13 is formed in an output-side end portion of the sun gear shaft 12. For example, a rotor of a compressor C as a driving target is connected to the flange 13. The sun gear shaft 12 is rotatably supported about the shaft line Ar by a sun gear bearing 42 arranged on the output side of the sun gear 11. The sun gear bearing 42 is attached to the transmission casing 41.

The planetary gear carrier 21 includes a planetary gear shaft 22 provided in each of the plurality of planetary gears 15, a carrier body 23 that fixes mutual positions of the plurality of planetary gear shafts 22, and a planetary gear carrier shaft 27 that is fixed to the carrier body 23 and extends in the axial direction about the shaft line Ar.

The planetary gear shaft 22 penetrates the center line Ap of the planetary gear 15 in the axial direction, and rotatably supports the planetary gear 15 about its center line. The carrier body 23 includes an output-side arm portion 24 that extends outwardly in the radial direction from the plurality of planetary gear shafts 22, a cylindrical portion 25 that forms a cylindrical shape about the shaft line Ar and extends from an outer end portion in the radial direction of the output-side arm portion 24 to the input side, and an input-side arm portion 26 that extends from the output-side end of the cylindrical portion 25 to an inward side in the radial direction.

The planetary gear carrier shaft 27 includes an output-side planetary gear carrier shaft 27o that extends from the output-side arm portion 24 to the output side, and an input-side planetary gear carrier shaft 27i that extends from the input-side arm portion 26 to the input side. The respective planetary gear carrier shafts 27o and 27i both form a cylindrical shape about the shaft line Ar. The output-side planetary gear carrier shaft 27o is rotatably supported about the shaft line Ar by a planetary gear carrier bearing 43 arranged on the output side relative to the output-side arm portion 24. This planetary gear carrier bearing 43 is attached to the transmission casing 41. The sun gear shaft 12 is inserted into an inner circumferential side of the output-side planetary gear carrier shaft 27o. The input-side planetary gear carrier shaft 27i is rotatably supported about the shaft line Ar by the planetary gear carrier bearing 44 arranged on the input side relative to the input-side arm portion 26. This planetary gear carrier bearing 44 is attached to the transmission casing 41. An annular flange 28 extending outwardly in the radial direction is formed in an input-side end of the input-side planetary gear carrier shaft 27i.

The internal gear carrier 31 includes a carrier body 33 to which the internal gear 17 is fixed, and a gear carrier shaft 37 that is fixed to the carrier body 33 and extends in the axial direction about the shaft line Ar.

The carrier body 33 includes a cylindrical portion 35 that forms a cylindrical shape about the shaft line Ar and in which the internal gear 17 is fixed to the inner circumferential side, and an input-side arm portion 36 that extends from the input end of the cylindrical portion 35 to an inward side in the radial direction.

The internal gear carrier shaft 37 forms a columnar shape about the shaft line Ar, and is arranged on the input side of the sun gear shaft 12 which forms a columnar shape about the same shaft line Ar. In the input-side arm portion 36 of the carrier body 33 is fixed to the internal gear carrier shaft 37. An annular or disc-shaped flange 38 extending outwardly in the radial direction is formed at the input-side end of the gear carrier shaft 37. A portion on the input side of the internal gear carrier shaft 37 is inserted into the inner circumferential side of the cylindrical input-side planetary gear carrier shaft 27i. Positions in the axial direction of the flange 38 of the internal gear carrier shaft 37 and the flange 28 of the input-side planetary gear carrier shaft 27i are substantially the same.

Figure 3:
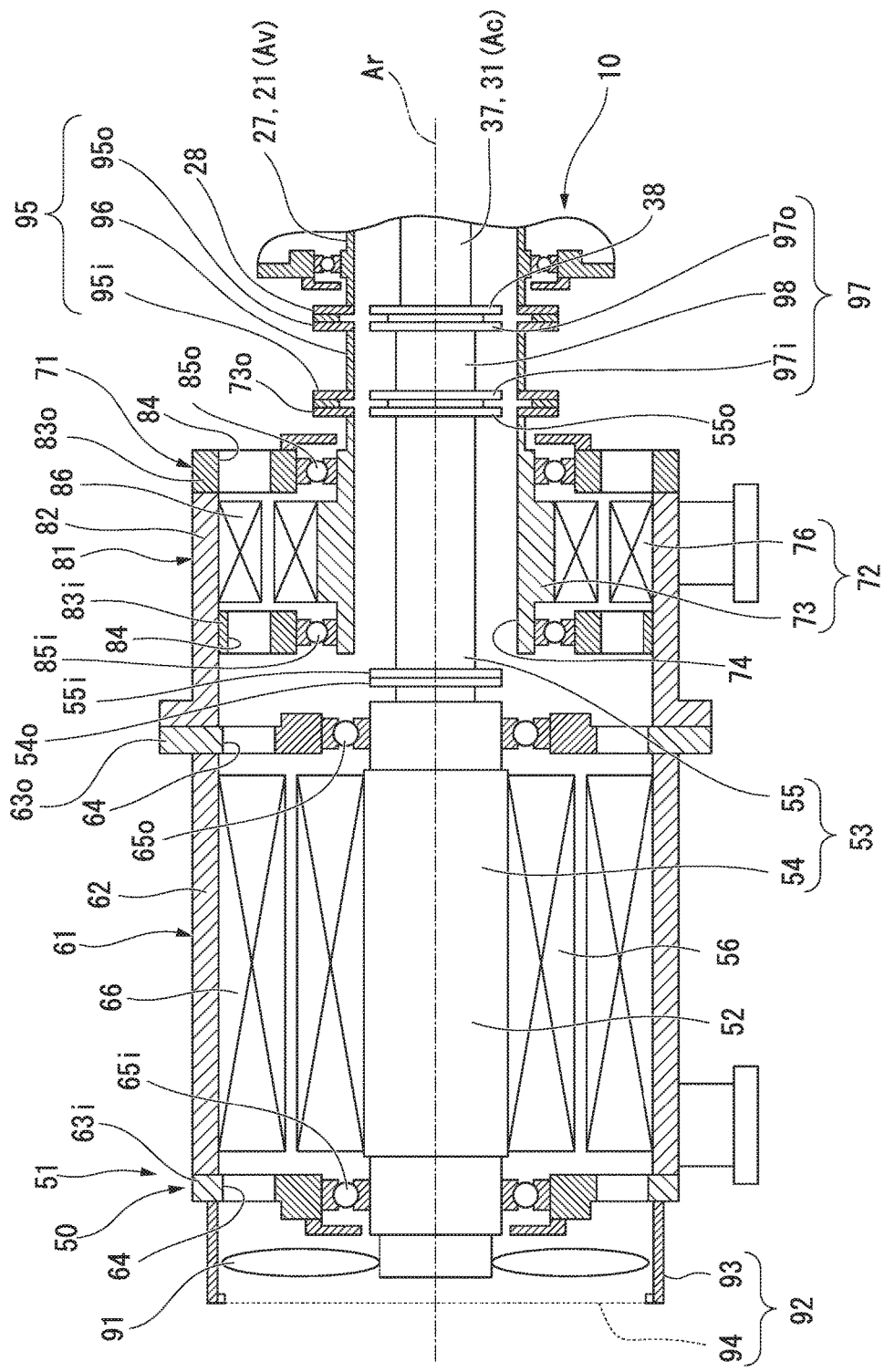
FIG. 3 is a cross-sectional view of an electric motor device in the first embodiment according to the present invention.

The electric motor device 50 includes a constant speed motor 51 that rotationally drives the internal gear carrier shaft 37 as a constant speed input shaft Ac, a variable speed motor 71 that rotates the input-side planetary gear carrier shaft 27i as a variable speed input shaft Av, a cooling fan 91 for cooling these, and a fan cover 92 that covers this cooling fan 91, as illustrated in FIG. 3.

In this embodiment, the constant speed motor 51 is, for example, a four-pole induction motor. Further, the variable speed motor 71 is a 12-pole induction motor having more poles than the constant speed motor 51.

The constant speed motor 51 includes a constant speed rotor 52 that rotates about the shaft line Ar and is connected to the internal gear carrier shaft 37 that is the constant speed input shaft Ac, a constant speed stator 66 arranged on the outer circumferential side of the constant speed rotor 52, and a constant speed motor casing 61 in which the constant speed stator 66 is fixed to the inner circumferential side.

The constant speed rotor 52 includes a constant speed rotor shaft 53, and a conductor 56 that is fixed to an outer circumference of the constant speed rotor shaft 53. Further, the constant speed rotor shaft 53 includes a constant speed rotor body shaft 54 that forms a columnar shape about the shaft line Ar and in which the conductor 56 is fixed to an outer circumference thereof, and a constant speed rotor extension shaft 55 that forms a columnar shape about the shaft line Ar and is fixed to the output side of the constant speed rotor body shaft 54. Annular or disc-shaped flanges 55i and 55o extending outwardly in the radial direction are formed at both ends in the axial direction of the constant speed rotor extension shaft 55. An annular or disc-shaped flange 54o extending outwardly in the radial direction is formed at an output-side end of the constant speed rotor body shaft 54. The constant speed rotor extension shaft 55 and the constant speed rotor body shaft 54 are integrally formed due to the respective flanges 55i, 55o, and 54o being connected to each other by bolts or the like. The above-described cooling fan 91 is fixed to the input-side end of the constant speed rotor body shaft 54.

The constant speed stator 66 is arranged on an outer side in the radial direction of the conductor 56 of the constant speed rotor 52. The constant speed stator 66 is formed of a plurality of coils.

The constant speed motor casing 61 includes a casing body 62 that forms a cylindrical shape about the shaft line Ar and in which he constant speed stator 66 is fixed to the inner circumference side, and lids 63i and 63o that close both ends in the axial direction of the cylindrical casing body 62. Constant speed rotor bearings 65i and 65o that rotatably support the constant speed rotor body shaft 54 about the shaft line Ar are attached to the respective lids 63i and 63o. Further, a plurality of openings 64 penetrating in the axial direction are formed at positions on the outer side in the radial direction relative to the constant speed rotor bearings 65i and 65o in the respective lids 63i and 63o.

An input-side end of the constant speed rotor body shaft 54 protrudes from the lid 63i on the input side of the constant speed motor casing 61 to the input side. The cooling fan 91 described above is fixed to the input-side end of the constant speed rotor body shaft 54. Therefore, when the constant speed rotor 52 rotates, the cooling fan 91 also rotates integrally with the constant speed rotor 52. The fan cover 92 includes a cylindrical cover body 93 arranged on the outer circumferential side of the cooling fan 91, and an air flow plate 94 attached to the opening on the inlet side of the cover body 93 and having a plurality of air holes formed therein. This fan cover 92 is fixed to the lid 63i on the input side of the constant speed motor casing 61.

The variable speed motor 71 includes a variable speed rotor 72 that rotates about the shaft line Ar and is connected to the input-side planetary gear carrier shaft 27i that is a variable speed input shaft Av, a variable speed stator 86 that is arranged on the outer circumferential side of the variable speed rotor 72, and a variable speed motor casing 81 in which the variable speed stator 86 is fixed to an inner circumferential side.

The variable speed rotor 72 includes a variable speed rotor shaft 73, and a conductor 76 fixed to an outer circumference of the constant speed rotor shaft 53. The variable speed rotor shaft 73 forms a cylindrical shape about the shaft line Ar, and includes a shaft insertion hole 74 penetrating in the axial direction formed therein. The constant speed rotor extension shaft 55 is inserted into the shaft insertion hole 74 of the variable speed rotor shaft 73. An annular flange 73o extending outwardly in the radial direction is formed at an output-side end of the variable speed rotor shaft 73. Positions in the axial direction of the flange 73o of the variable speed rotor shaft 73 and a flange 55o formed at the output-side end of the constant speed rotor extension shaft 55 substantially match.

In this embodiment, the variable speed rotor 72 in which the shaft insertion hole 74 is formed forms a first rotor, and the constant speed rotor 52 inserted into the shaft insertion hole 74 forms a second rotor.

The variable speed stator 86 is arranged on the outer side in the radial direction of the conductors 56 and 76 of the variable speed rotor 72. This variable speed stator 86 is formed by a plurality of coils.

A variable speed motor casing 81 includes a casing body 82 that forms a cylindrical shape about the shaft line Ar and in which the variable speed stator 86 is fixed to an inner circumferential side thereof, an output-side lid 83o that closes an output-side end of the cylindrical casing body 82, and an inlet-side lid 83i arranged on an input side relative to the variable speed stator 86 and fixed to an inner circumferential side of the cylindrical casing body 82. Variable speed rotor bearings 85i and 85o that support the variable speed rotor shaft 73 to be rotatable about the shaft line Ar are attached to the respective lids 83i and 83o. Further, a plurality of openings 84 penetrating in the axial direction are formed at positions on the outer side in the radial direction relative to the variable speed rotor bearings 85*i* and 85*o* in the respective lids 83*i* and 83*o*.

As described above, a space in the variable speed motor casing 81 and a space in the constant speed motor casing 61 communicate with each other due to the plurality of openings 84 formed in the lids 83*i* and 83*o* of the variable speed motor casing 81 and the plurality of openings 64 formed in the respective lids 63*i* and 63*o* of the constant speed motor casing 61.

The rotational driving force imparting device of this embodiment further includes a variable speed flexible coupling 95 that is arranged between the input-side planetary gear carrier shaft 27*i* that is the variable speed input shaft Av and the variable speed rotor 72 and connects the input-side planetary gear carrier shaft 27*i* to the variable speed rotor 72, and a constant speed flexible coupling 97 that is arranged between the internal gear carrier shaft 37 that is the constant speed input shaft Ac and the constant speed rotor 52 and connects the internal gear carrier shaft 37 to the constant speed rotor 52.

The variable speed flexible coupling 95 includes a cylindrical portion 96 forming a cylindrical shape and having flexibility at least in each direction perpendicular to the central shaft line Ar of a cylinder, and annular flanges 95*i* and 95*o* provided on both sides of the cylindrical portion 96.

The constant speed flexible coupling 97 includes a cylindrical portion 98 forming a cylindrical shape or a columnar shape having flexibility at least in each direction perpendicular to the cylindrical or columnar center shaft line Ar, and annular or disc-shaped flanges 97*i* and 97*o* provided on both sides of the cylindrical portion 98.

The variable speed flexible coupling 95 is arranged on the outer circumferential side of the constant speed flexible coupling 97. A length in an axial direction of the constant speed flexible coupling 97 and a length in an axial direction of the variable speed flexible coupling 95 are the same.

An outer diameter of each of the flanges 95*i* and 95*o* of the variable speed flexible coupling 95, an outer diameter of the flange 28 of the planetary gear carrier 21, and an outer diameter of the flange 73*o* of the variable speed rotor 72 are the same. Therefore, the respective flanges 28, 73*o*, 95*i*, and 95*o* face each other in the axial direction. Therefore, it is possible to connect the flange 28 of the planetary gear carrier 21 to the flange 73*o* of the variable speed rotor 72 using a general flexible coupling.

The output-side flange 95*o* of the variable speed flexible coupling 95 and the flange 28 of the planetary gear carrier 21 are connected to each other by a bolt or the like. Further, the input-side flange 95*i* of the variable speed flexible coupling 95 and the flange 73*o* of the variable speed rotor 72 are connected to each other by a bolt or the like.

An outer diameter of each of the flanges 97*i* and 97*o* of the constant speed flexible coupling 97, an outer diameter of the flange 38 of the internal gear carrier 31, and an outer diameter of the output-side flange 55*o* of the constant speed rotor extension shaft 55 are the same. Therefore, the respective flanges 38, 55*o*, 97*i*, and 97*o* face each other in the axial direction. Therefore, it is possible to connect the flange 38 of the internal gear carrier 31 to the output-side flange 55*o* of the constant speed rotor extension shaft 55 using a general flexible coupling.

The output-side flange 97*o* of the constant speed flexible coupling 97 and the flange 38 of the internal gear carrier 31 are connected to each other by a bolt or the like. Further, the input-side flange 97*i* of the constant speed flexible coupling 97 and the output-side flange 55*o* of the constant speed rotor extension shaft 55 are connected to each other by a bolt or the like.

In the above description, the cylindrical portion 96 of the variable speed flexible coupling 95 and the cylindrical portion 98 of the constant speed flexible coupling 97 are both flexible at least in respective directions perpendicular to the cylindrical or columnar central shaft line Ar. However, the cylindrical portions 96 and 98 of the couplings 95 and 97 may not be flexible if the output side is movable relative to the input side at least in respective directions perpendicular to the cylindrical or columnar central shaft line Ar.

Further, in this embodiment, the variable speed flexible coupling 95 to be connected to the variable speed rotor 72 that is a first rotor forms the first flexible coupling, and the constant speed flexible coupling 97 to be connected to the constant speed rotor 52 that is the second rotor forms the second flexible coupling.

Further, in this embodiment, the variable speed input shaft Av to be connected to the variable speed rotor 72 that is the first rotor via the variable speed flexible coupling 95 that is the first flexible coupling forms the first input shaft. Further, in this embodiment, the constant speed input shaft Ac to be connected to the constant speed rotor 52 that is the second rotor via the constant speed flexible coupling 97 that is the second flexible coupling forms the second input shaft. Therefore, the flange 73*o* of the variable speed rotor 72 that is the first rotor forms a rotor-side connection portion, and the flange 28 of the variable speed input shaft Av that is the first input shaft forms a transmission device-side connection portion.

The rotational driving force imparting device of this embodiment further includes a frequency conversion device 100 that changes a frequency of power to be supplied to the variable speed motor 71, a first switch 111 that sets the constant speed motor 51 to a power supply state and a power disconnection state, a second switch 112 that sets the variable speed motor 71 to a power supply state and a power disconnection state, and a controller 120 that controls an operation of the frequency conversion device 100, the first switch 111, and the second switch 112, as illustrated in FIG. 1.

The first switch 111 is electrically connected to a power line 110 and the constant speed motor 51. The second switch 112 is electrically connected to the power line 110 and the frequency conversion device 100. This frequency conversion device 100 is electrically connected to the variable speed motor 71.

The controller 120 includes a computer. The controller 120 includes a reception unit 121 that directly receives an instruction from an operator or receives an instruction from a high-level control device, an interface 122 that provides an instruction to the first switch 111, the second switch 112, and the frequency conversion device 100, and a calculation unit 123 that creates the instruction for the first switch 111, the second switch 112, and the frequency conversion device 100 according to the instruction received by the reception unit 121.

The first switch 111 is turned ON by an ON instruction from the controller 120 and turned OFF by an OFF instruction from the controller 120. When the first switch 111 is turned on, power from the power line 110 is supplied to the constant speed motor 51, and the constant speed motor 51 enters a power supply state. When the first switch 111 is turned OFF, the power supply from the power line 110 to the constant speed motor 51 is disconnected and the constant speed motor 51 enters a power disconnection state.

The second switch 112 is turned ON by the ON instruction from the controller 120 and turned OFF by the OFF instruction from the controller 120. When the second switch 112 is turned on, the power from the power line 110 is supplied to the variable speed motor 71 via the frequency conversion device 100 and the variable speed motor 71 enters a power supply state. When the second switch 112 is turned OFF, the power supply from the power line 110 to the frequency conversion device 100 and the variable speed motor 71 is disconnected and the variable speed motor 71 enters a power disconnection state.

The frequency conversion device 100 supplies the power at the frequency instructed from the controller 120 to the variable speed motor 71. The variable speed rotor 72 of the variable speed motor 71 rotates at a rotational speed according to this frequency. Thus, a rotational speed of the planetary gear carrier 21 of the transmission device 10 connected to the variable speed rotor 72 changes since a rotational speed of the variable speed rotor 72 changes. As a result, a rotational speed of the sun gear shaft 12, which is the output shaft Ao of the transmission device 10, also changes.

Figure 4:
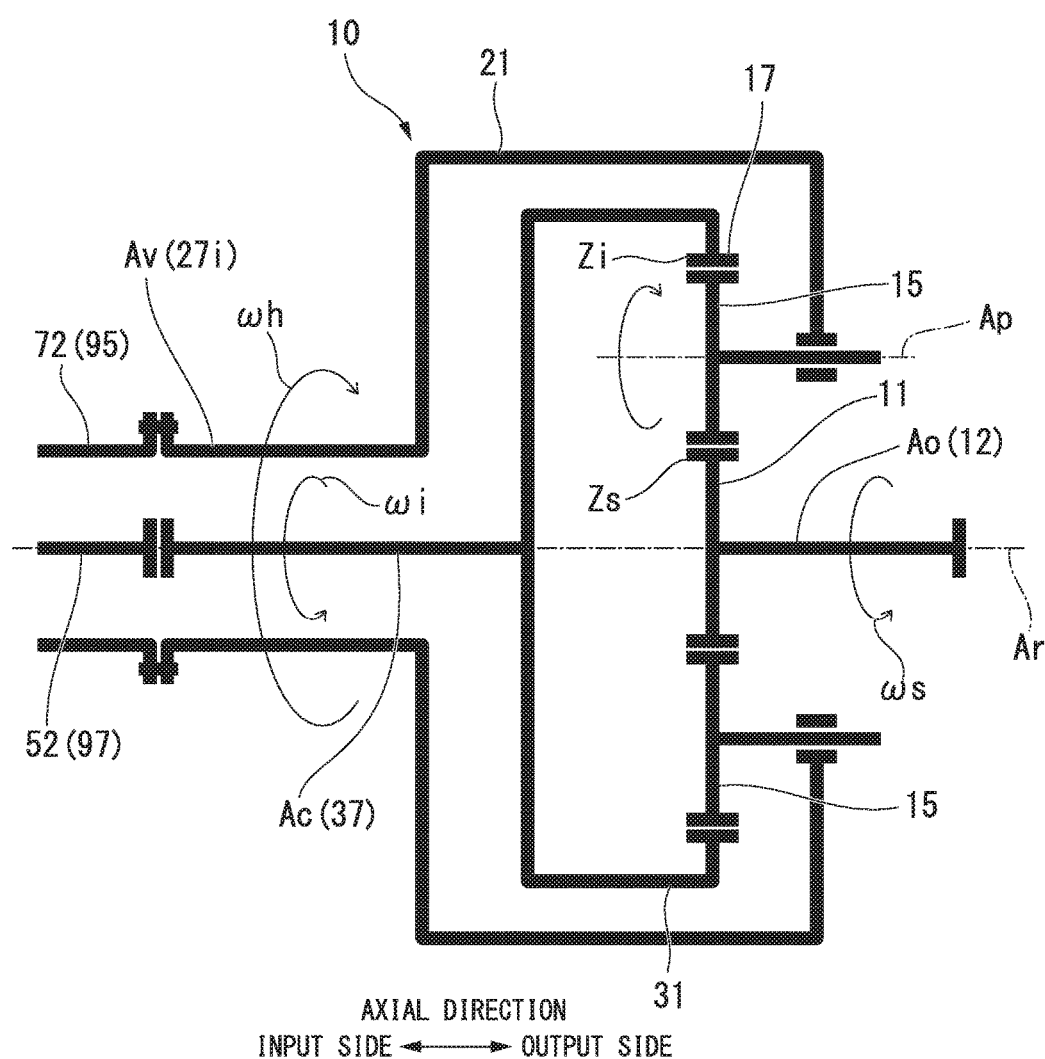
FIG. 4 is a schematic diagram illustrating a configuration of the transmission device in the first embodiment according to the present invention.

Here, a relationship between the number of teeth of each gear of the transmission device 10 and a rotational speed of each shaft of the transmission device 10 will be described with reference to FIG. 4.

The number of rotations of the sun gear shaft 12 that is the output shaft Ao is assumed to be $\omega s$, a rotational speed of the internal gear rotation carrier shaft 37 that is the constant speed input shaft Ac is assumed to be $\omega i$, and a rotational speed of the input-side planetary gear carrier shaft 27$i$ is assumed to be $\omega h$. Further, the number of teeth of the sun gear 11 is assumed to be Zs, and the number of teeth of the internal gear 17 is assumed to be Zi.

In this case, a relationship between the number of teeth of the gears and a rotational speed of each shaft of the transmission device 10 can be represented by Equation (1).

$$\omega s/\omega i = \omega h/\omega i - (1-\omega h/\omega i) \times Zi/Zs \quad (1)$$

If the constant speed motor 51 is a 4-pole induction motor as described above and the power supply frequency is 50 Hz, a rotational speed of the constant speed rotor 52 and a rotational speed $\omega i$ of the constant speed input shaft Ac become 1500 rpm. Further, if the variable speed motor 71 is a 12-pole induction motor as described above and the power supply frequency is 50 Hz, a maximum rotational speed of the variable speed rotor 72 and a maximum rotational speed $\omega h$ of the variable speed input shaft Av become 500 rpm. Further, a ratio Zi/Zs between the number of teeth Zs of the sun gear 11 and the number of teeth Zi of the internal gear 17 is assumed to be 8.

In this case, for a maximum rotational speed of rotation (−500 rpm) in which the direction of rotation of the constant speed rotor 52 is forward rotation and the direction of rotation of the variable speed rotor 72 is opposite to the direction of the rotation of the constant speed rotor 52, a rotational speed of the output shaft Ao is −16500 rpm.

Further, in a maximum rotational speed of rotation (+500 rpm) in which the direction of rotation of the constant speed rotor 52 is forward rotation and the direction of rotation of the variable speed rotor 72 is the same as the direction of the rotation of the constant speed rotor 52, a rotational speed of the output shaft Ao is −7500 rpm.

If the direction of rotation of the constant speed rotor 52 is forward rotation and a rotational speed of the variable speed rotor 72 is 0 rpm, a rotational speed of the output shaft Ao is −12000 rpm.

In a minimum rotational speed of rotation (−50 rpm) in which the direction of rotation of the constant speed rotor 52 is forward rotation and the direction of rotation of the variable speed rotor 72 is opposite to the direction of the rotation of the constant speed rotor 52, a rotational speed of the output shaft Ao is −12450 rpm.

In a minimum rotational speed of rotation (+50 rpm) in which the direction of rotation of the constant speed rotor 52 is forward rotation and the direction of rotation of the variable speed rotor 72 is the same as the direction of the rotation of the constant speed rotor 52, a rotational speed of the output shaft Ao is −11550 rpm.

Therefore, if a rotational speed of the constant speed rotor 52 is +1500 rpm and a rotational speed of the variable speed rotor 72 can be controlled in a range of −50 to −500 rpm under the frequency control of the frequency conversion device 100, in other words, if the frequency of power supplied to the variable speed motor 71 can be controlled in a range of 5 to 50 rpm, a rotational speed of the output shaft Ao can be controlled in a range of −12450 to −16500 rpm.

Figure 5:
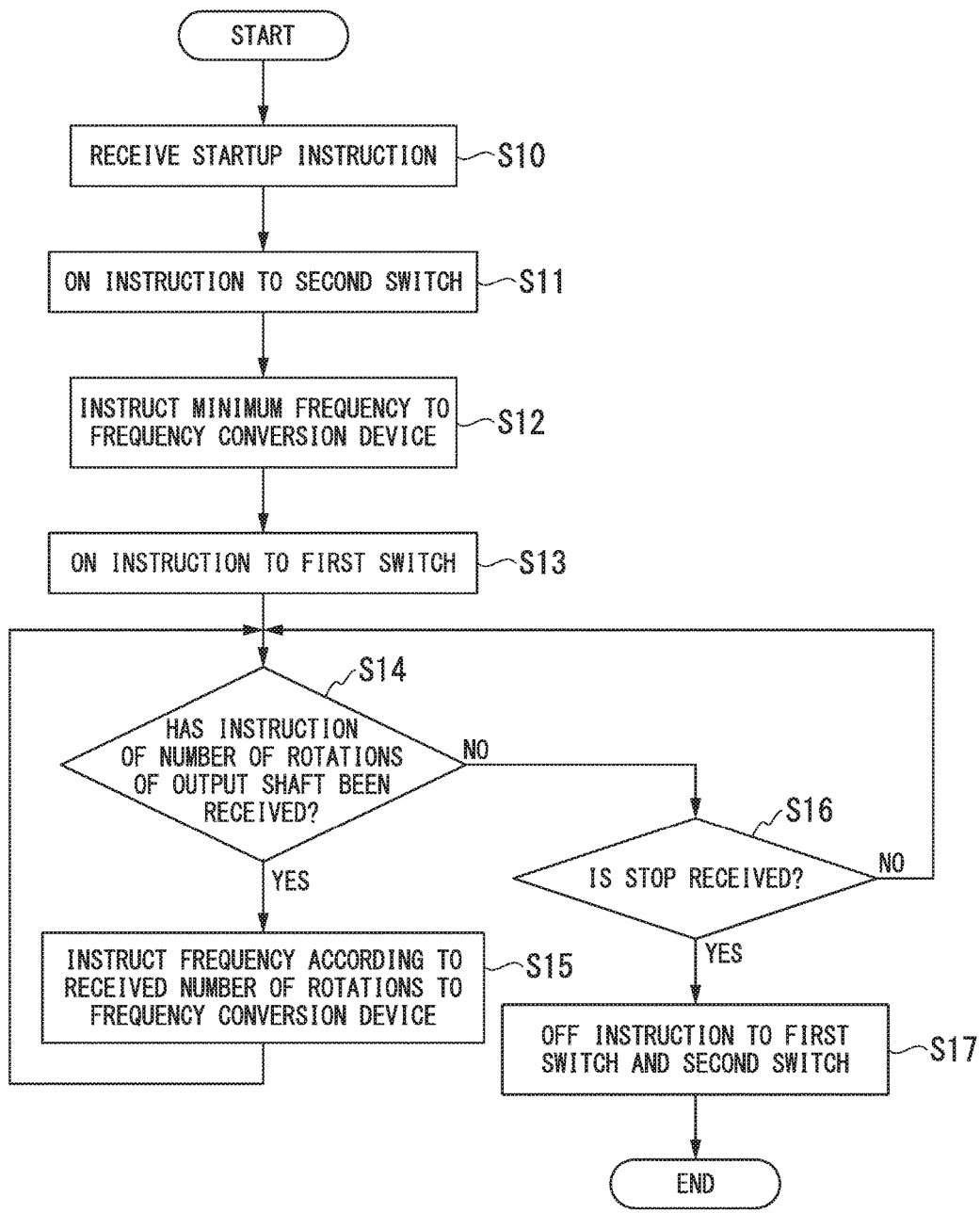
FIG. 5 is a flowchart illustrating an operation of a controller in the first embodiment according to the present invention.

Next, an operation from startup to stop of the rotational driving force imparting device of this embodiment will be described with reference to a flowchart illustrated in FIG. 5.

When the controller 120 receives a startup instruction for the rotational driving force imparting device from the outside (S10), the controller 120 outputs an ON instruction to the second switch 112 (S11) and instructs a minimum frequency to the frequency conversion device 100 (S12). Here, the minimum frequency is a minimum frequency that can be set by the frequency conversion device 100 or a minimum frequency set in advance by an operator or the like. Here, for example, one-tenth of the power supply frequency (50 Hz) is set as the minimum frequency (5 Hz).

The second switch 112 receives the ON instruction from the controller 120, the second switch 112 is turned ON and the power from the power line 110 is supplied to the frequency conversion device 100. Further, when the frequency conversion device 100 receives the minimum frequency as an instruction value of the frequency from the controller 120, the frequency conversion device 100 converts the frequency of the power from the power line 110 to a minimum frequency and supplies the resultant power to the variable speed motor 71. As a result, the variable speed motor 71 enters a power supply state in which the power at the minimum frequency is supplied. When the variable speed motor 71 of this embodiment receives power at the same frequency (maximum frequency: 50 Hz) as the power supply frequency, a rotational speed is 500 rpm that is the maximum rotational speed, as described above. Therefore, when power of which a minimum frequency (5 Hz) is 1/10 of a power frequency is received, a rotational speed of the variable speed motor 71 is 50 rpm that is the minimum rotational speed, as described above. Here, the direction of the rotation of the variable speed motor 71 is opposite to the direction of the rotation of the constant speed motor 51. Therefore, a rotational speed of the variable speed motor 71 is −50 rpm when the direction of the rotation of the constant speed motor 51 is forward rotation.

If the constant speed motor 51 does not rotate and a rotational speed of the constant speed motor 51 and the constant speed input shaft Ac connected thereto is 0 rpm, a relationship between the number of teeth of each gear of the transmission device 10 and a rotational speed of each shaft of the transmission device 10 can be expressed by Equation (2) below.

$$\omega s/\omega h = Zi/Zs + 1 \quad (2)$$

If the ratio $Z_i/Z_s$ between the number of teeth $Z_s$ of the sun gear 11 and the number of teeth $Z_i$ of the internal gear 17 is 8 similar to the above-described case, a rotational speed ωs of the output shaft Ao is a −450 rpm when a rotational speed ωh of the variable speed motor 71 and the variable speed input shaft Av connected thereto is −50 rpm that is the minimum rotational speed.

Thus, when the constant speed motor 51 does not rotate, a rotational speed ωs of the output shaft Ao when only the variable speed motor 71 is rotated at the minimum rotational speed is much smaller than a range (−12450 to −16500 rpm) of a rotational speed ωs of the output shaft Ao when the constant speed motor 51 and the variable speed motor 71 are both rotated.

Therefore, in this embodiment, if a driving target connected to the output shaft Ao is the compressor C and $GD^2$ is great, it is possible to reduce the startup load torque of the electric motor device 50.

The controller 120 outputs an ON instruction to the first switch 111 if the variable speed rotor 72 of the variable speed motor 71 begins to rotate and the output shaft Ao begins to rotate (S13).

If the first switch 111 receives the ON instruction from the controller 120, the first switch 111 is turned on, power from the power line 110 is supplied to the constant speed motor 51, and the constant speed motor 51 enters a power supply state. When the constant speed motor 51 in this embodiment receives power from the power line 110, a rotational speed becomes, for example, 1500 rpm, as described above.

When a rotational speed of the constant speed motor 51 and the constant speed input shaft Ac connected thereto is 1500 rpm and a rotational speed of the variable speed motor 71 and the variable speed input shaft Av connected thereto is a minimum of 50 rpm (however, a direction opposite to the rotation direction of the constant input shaft Ac), a rotational speed of the output shaft Ao is, for example, 12450 rpm which is a minimum controllable rotational speed (however, a direction opposite to the rotation direction of the constant input shaft Ac), as described above.

The controller 120 then waits to receive an instruction of the target number of rotations of the output shaft Ao (S14) or a stop instruction (S16). If the controller 120 receives the instruction of the target number of rotations, the controller 120 instructs a frequency according to the received target number of rotations to the frequency conversion device 100 (S15).

When the frequency conversion device 100 receives this instruction, the frequency conversion device 100 supplies power at a frequency according to the received target number of rotations to the variable speed motor 71. The number of rotations of the variable speed motor 71 and the variable speed input shaft Av connected thereto becomes a rotational speed (−50 to −500 rpm) according to the target number of rotations of the output shaft Ao. As a result, a rotational speed of the output shaft Ao becomes the target number of rotations (−12450 to −16500 rpm).

After the controller 120 instructs the frequency according to the received target number of rotations to the frequency conversion device 100 (S15), the controller 120 waits again to receive the instruction of the target number of rotations of the output shaft Ao (S14) or the stop instruction (S16). If the controller 120 receives the stop instruction in this state, the controller 120 outputs an OFF instruction to the first switch 111 and the second switch 112 (S17).

When the first switch 111 and the second switch 112 receive the OFF instruction from the controller 120, both are turned OFF. Therefore, the power from the power line 110 is not supplied to the constant speed motor 51 and the variable speed motor 71, and each of the constant speed motor 51 and the variable speed motor 71 enters a power disconnection state. As a result, the output shaft Ao stops.

As described above, in this embodiment, it is possible to reduce the startup load torque of the electric motor device 50.

Further, in this embodiment, since the constant speed rotor 52 of the constant speed motor 51 and the variable speed rotor 72 of the variable speed motor 71 are arranged on the shaft line Ar of the transmission device 10, it is possible to achieve miniaturization as a whole, unlike a case in which the constant speed rotor 52 and the variable speed rotor 72 are arranged at a position separate in the radial direction from the shaft line Ar of the transmission device 10. Further, in this embodiment, since it is not necessary to provide a transfer mechanism such as a belt or a pulley unlike a case in which the constant speed rotor 52 and the variable speed rotor 72 are arranged at a position separate in the radial direction from the shaft line Ar of the transmission device 10, it is possible to achieve miniaturization of the device from this point of view and reduction of a manufacturing cost due to a reduced number of parts. Further, in this embodiment, a bending load is not applied from the belt or the like to a shaft located on the shaft line Ar of the transmission device 10, and it is possible to also achieve a reduction of vibration since it is not necessary to provide a transfer mechanism such as a belt or a pulley unlike a case in which the constant speed rotor 52 and the variable speed rotor 72 are arranged at a position separate in the radial direction from the shaft line Ar of the transmission device 10.

In this embodiment, since the constant speed rotor 52 of the electric motor device 50 and the constant speed input shaft Ac of the transmission device 10 are connected to each other by a constant speed flexible coupling 97, it is possible to allow eccentricity, angular deflection, and vibration between the constant speed rotor 52 and the constant speed input shaft Ac. Further, in this embodiment, since the variable speed rotor 72 of the electric motor device 50 and the variable speed input shaft Av of the transmission device 10 are connected to each other by the variable speed flexible coupling 95, it is possible to allow eccentricity, angular deflection, and vibration between the variable speed rotor 72 and the variable speed input shaft Av. Therefore, in this embodiment, it is possible to minimize time and effort of work of centering the transmission device 10 on the electric motor device 50, and to suppress transfer of shaft vibration from the electric motor device 50 to the transmission device 10 and transfer of shaft vibration from the transmission device 10 to the electric motor device 50.

Further, in this embodiment, the constant speed flexible coupling (second flexible coupling) 97 is arranged on the inner circumferential side of the variable speed flexible coupling (first flexible coupling) 95, but since a length in the axial direction of the constant speed flexible coupling (the second flexible coupling) 97 is equal to or smaller than the length in the axial direction of the variable speed flexible coupling (first flexible coupling) 95, it is possible to easily perform attachment work of the respective flexible couplings 97 and 95.

In this embodiment, the variable speed motor casing 81 is fixed to the constant speed motor casing 61. Therefore, in this embodiment, it is possible to accurately perform positioning (centering) of the variable speed rotor 72 with respect to the constant speed rotor 52 prior to shipment from the manufacturing plant of the rotational driving force imparting device. Therefore, in this embodiment, work for positioning the variable speed rotor 72 with respect to the constant speed rotor 52 in an installation site may be omitted.

In this embodiment, when the constant speed rotor 52 rotates, the cooling fan 91 provided at an end of the constant speed rotor 52 also rotates. Due to the rotation of the cooling fan 91, external air flows into the constant speed motor casing 61 to cool, for example, the constant speed rotor 52 and a constant speed stator 66. Further, in this embodiment, since the constant speed motor casing 61 and the variable speed motor casing 81 communicate with each other, air flowing into the constant speed motor casing 61 also flows into the variable speed motor casing 81 to cool, for example, the speed rotor 72 or the variable speed stator 86. Therefore, in this embodiment, it is possible to cool the two motors with one cooling fan 91. From this point of view, it is possible to reduce a size and a manufacturing cost of the device.

<Second Embodiment>

A second embodiment of the rotational driving force imparting device according to the present invention will be described with reference to FIGS. 6 and 7.

Figure 6:
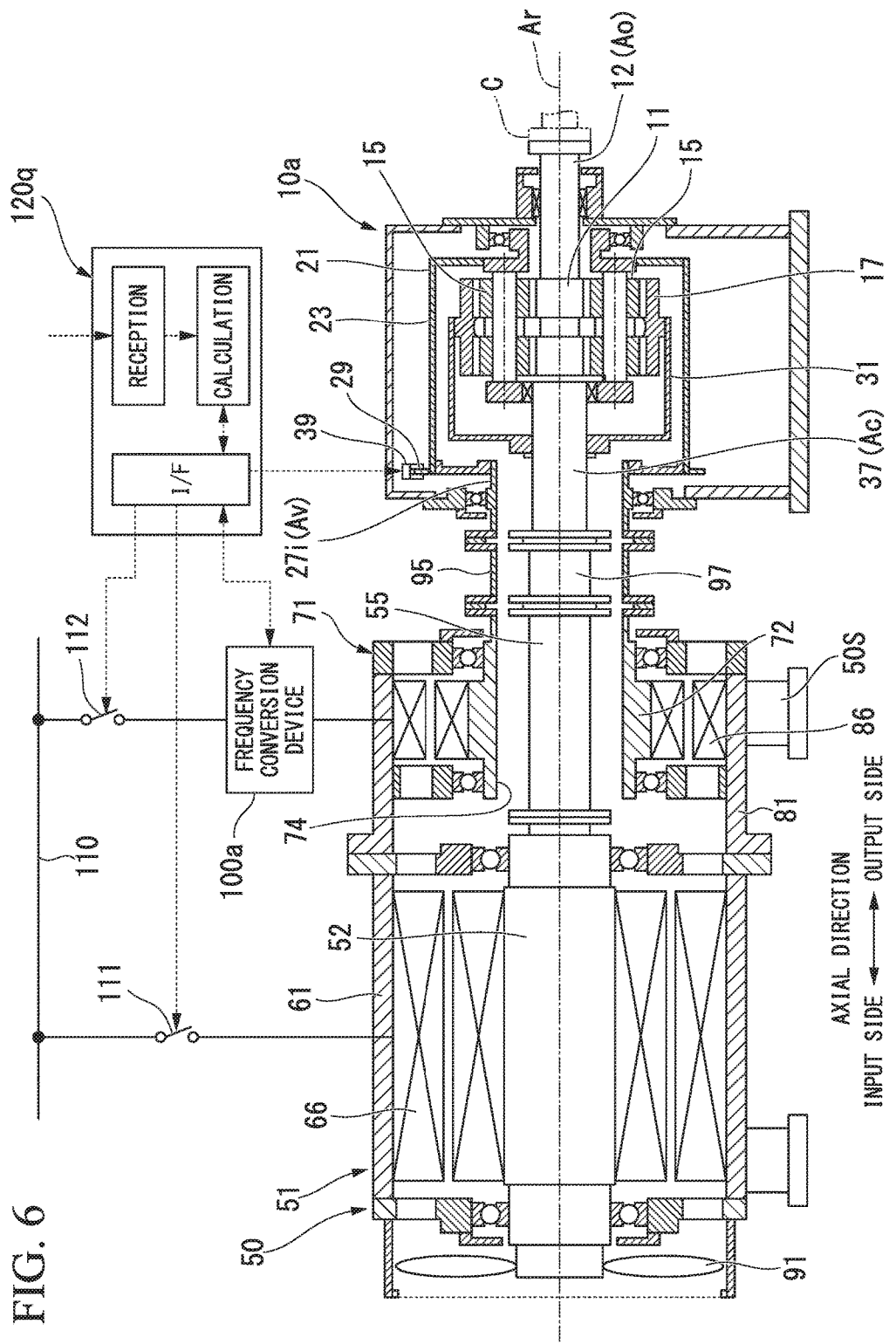
FIG. 6 is a cross-sectional view of a rotational driving force imparting device in a second embodiment according to the present invention.
Figure 7:
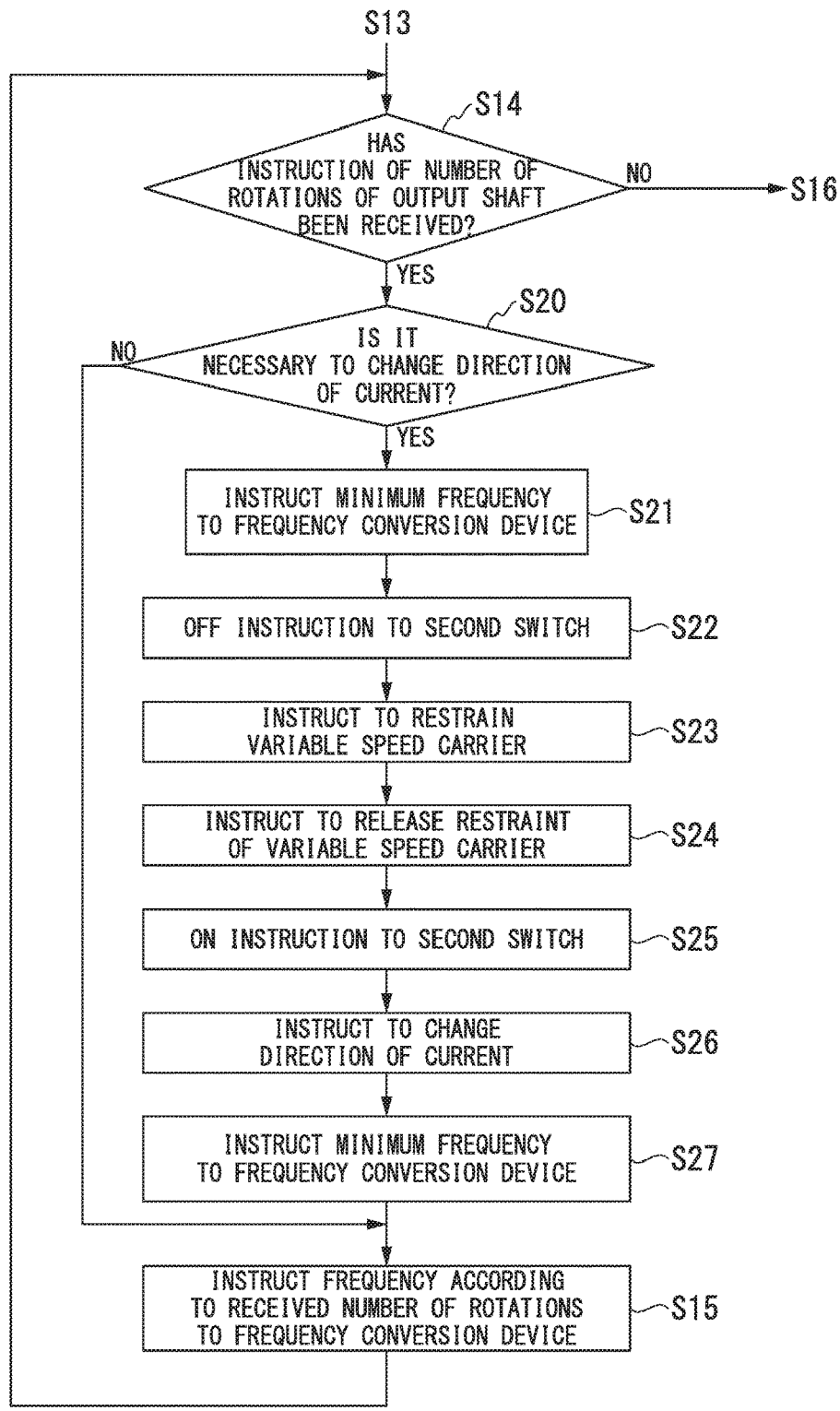
FIG. 7 is a flowchart illustrating an operation of a controller in the second embodiment according to the present invention.

The rotational driving force imparting device of this embodiment includes an electric motor device 50, a transmission device 10a, a frequency conversion device 100a, a first switch 111, a second switch 112, and a controller 120a, similar to the driving force imparting device of the first embodiment, as illustrated in FIG. 6. Among these, the electric motor device 50, the first switch 111, and the second switch 112, are the same as those in the first embodiment.

The transmission device 10a of this embodiment includes a brake 39 that restrains rotation of a planetary gear carrier 21 about a shaft line Ar. The planetary gear carrier 21 includes a brake disc 29 that forms an annular shape extending from a carrier body 23 to an outer circumferential side. The brake 39 is attached to the transmission casing 41, the brake disc 29 of the planetary gear carrier 21 is interposed therebetween, and the planetary gear carrier 21 is restrained so that the planetary gear carrier 21 is not rotatable.

The frequency conversion device 100a of this embodiment can change the frequency of the power that is supplied to the variable speed motor 71, and change the direction of the current that is supplied to the variable speed motor 71. Therefore, the frequency conversion device 100a of this embodiment is a reversible frequency conversion device, and can change the direction of rotation of the variable speed rotor 72 of the variable speed motor 71.

The controller 120a of this embodiment controls the operation of the frequency conversion device 100a, the first switch 111, and the second switch 112, similar to the controller 120 of the first embodiment. Further, the controller 120a of this embodiment instructs the frequency conversion device 100a to change the direction of the current to be supplied to the variable speed motor 71. Further, the controller 120a of this embodiment instructs restraint of the rotation of the planetary gear carrier 21 to be performed by the brake 39 of the transmission device 10a, and instructs release of the restraint.

In the first embodiment, a rotational speed of the constant speed rotor 52 is +1500 rpm, and a rotational speed of the variable speed rotor 72 is controlled in a range of −50 to −500 rpm under the frequency control of the frequency conversion device 100, to thereby control a rotational speed of the output shaft Ao in the range of −12450 to −16500 rpm. If the direction of the current supplied to the variable speed motor 71 can be changed, a rotational speed of the variable speed rotor 72 can be set to +50 to +500 rpm, and a rotational speed of the output shaft Ao can be set −11550 to −7500 rpm, as described above.

Therefore, in this embodiment, a reversible frequency conversion device capable of changing the direction of the current to be supplied to the variable speed motor 71 is adopted as the frequency conversion device 100a to widen a variable region of a rotational speed of the output shaft Ao.

Startup and stop operations of the rotational driving force imparting device of this embodiment are the same as in the operation of the rotational driving force imparting device of the first embodiment. In the rotational driving force imparting device of this embodiment, an operation when the output shaft Ao of the transmission device 10a begins to rotate, and then, a rotational speed of the output shaft Ao changes to a desired number of rotations is different from in the rotational driving force imparting device of the first embodiment.

Hereinafter, an operation of the rotational driving force imparting device when a rotational speed of the output shaft Ao is changed to a desired number of rotations will be described with reference to a flowchart in FIG. 7.

The controller 120a outputs an ON instruction to the first switch 111, similar to the first embodiment (S13). When receiving an instruction of the target number of rotations of the output shaft Ao after the constant speed motor 51 begins to rotate, for example, at 1500 rpm (S14), the controller 120a determines whether it is necessary to change the direction of the current that is supplied to the variable speed motor 71 in order to realize the target number of rotations (S20: determination step).

When the controller 120a determines that it is necessary for the direction of current to be supplied to the variable speed motor 71 to be changed, the controller 120a instructs a minimum frequency to the frequency conversion device 100a (S21: first minimum frequency instruction step).

When the frequency conversion device 100a receives the minimum frequency as an instruction value of the frequency from the controller 120a, the frequency conversion device 100a converts the frequency of the power from the power line 110 to the minimum frequency and supplies the resultant power to the variable speed motor 71. As a result, the variable speed motor 71 enters a power supply state in which the power at the minimum frequency is supplied. Therefore, a rotational speed becomes −50 rpm that is a minimum rotational speed when the variable speed motor 71 rotates in a direction opposite to the direction of rotation of the constant speed motor 51, and becomes +50 rpm that is the minimum rotational speed when the variable speed motor 71 rotates in the same direction as the direction of rotation of the constant speed motor 51. As a result, a rotational speed of the output shaft Ao of the transmission device 10a becomes −12450 rpm when the variable speed motor 71 rotates in a direction opposite to the direction of rotation of the constant speed motor 51, and becomes −11550 rpm when the variable speed motor 71 rotates in the same direction as the direction of rotation of the constant speed motor 51.

When a rotational speed of the variable speed motor 71 is the minimum rotational speed (−50 rpm or +50 rpm), the controller 120a outputs an OFF instruction to the second switch 112 (S22: switch OFF instruction step), and instructs the brake 39 to restrain the rotation of the planetary gear carrier 21 (or the variable speed input shaft Av) (S23). Thus, the variable speed motor 71 enters a power disconnection state, and the rotation about the shaft line Ar of the planetary gear carrier 21 (or the variable speed input shaft Av) connected to the variable speed motor 71 stops.

When the rotation of the planetary gear carrier 21 (or the variable speed input shaft Av) stops, the controller 120*a* instructs the brake 39 to release the rotation restraint of the planetary gear carrier 21 (or the variable speed input shaft Av) (S24), and outputs an ON instruction to the second switch 112 (S25). Further, the controller 120*a* instructs the frequency conversion device 100*a* to change the direction of the current that is supplied to the variable speed motor 71 (S26), and instructs a minimum frequency (S27: second minimum frequency instruction process). Thus, the variable speed motor 71 enters a power supply state in which the direction of the current to be supplied becomes a reverse direction, a rotational speed becomes the minimum rotational speed, and the direction of the rotation becomes a reverse direction. Thus, when the variable speed motor 71 first rotates in a direction opposite to the direction of rotation of the constant speed motor 51, the direction of the rotation is the same as the direction of rotation of the constant speed motor 51, and a rotational speed becomes +50 rpm, which is the minimum rotational speed. As a result, a rotational speed of the output shaft Ao of the transmission device 10*a* becomes −11550 rpm. Further, when the variable speed motor 71 first rotates in the same direction as the direction of the rotation of the constant speed motor 51, the direction of the rotation becomes opposite to the direction of the rotation of the constant speed motor 51, and a rotational speed becomes −50 rpm, which is the minimum rotational speed. As a result, a rotational speed of the output shaft Ao of the transmission device 10*a* becomes −12450 rpm. In this embodiment, the process step in S25 and S26 described above forms a switch ON and current direction change instruction step. Further, in this embodiment, the process step in S23 and S24 described above forms a braking operation instruction process.

When a rotational speed of the variable speed motor 71 is a minimum rotational speed, the controller 120*a* instructs a frequency according to the target number of rotations of the output shaft Ao received in step 14 (S14) to the frequency conversion device 100*a* (S15: target frequency instruction process), similar to the first embodiment.

Further, even when the controller 120*a* determines that it is unnecessary for the direction of current to be changed in the step 20 (S20), the controller 120*a* instructs a frequency according to the target number of rotations of the output shaft Ao received in step 14 (S14) to the frequency conversion device 100*a* (S15: a target frequency instruction process).

When the frequency conversion device 100*a* receives this instruction, the frequency conversion device 100*a* supplies power at the received frequency according to the target number of rotations to the variable speed motor 71. The number of rotations of the variable speed motor 71 and the variable speed input shaft Av connected thereto becomes a rotational speed (+50 to +500 rpm or −50 to −500 rpm) according to the target number of rotations of the output shaft Ao and, as a result, a rotational speed of the output shaft Ao is the target number of rotations (−7500 to −11550 rpm or −12450 to −16500 rpm).

As described above, in this embodiment, since a reversible frequency conversion device capable of changing the direction of the current supplied to the variable speed motor 71 is adopted as the frequency conversion device 100*a* as described above, it is possible to widen the variable region of a rotational speed of the output shaft Ao.

Further, in this embodiment, when a direction of current to be supplied to the variable speed motor 71 is changed to change the direction of rotation of the variable speed motor 71, a rotational speed is set to the minimum rotational speed in the direction of rotations in a current situation, and then, the rotation of the variable speed motor 71 and the variable speed input shaft Av connected thereto is restrained. In this embodiment, after the restraint of the rotation of the variable speed input shaft Av is released, the direction of rotation of the variable speed motor 71 is opposite to the direction of previous rotation, a rotational speed is a minimum rotational speed, and then, a rotational speed is a rotational speed according to the target number of rotations of the output shaft Ao. Therefore, in this embodiment, when the direction of the current that is supplied to the variable speed motor 71 is changed, it is possible to suppress an abrupt change in a rotational speed of the output shaft Ao and a rotational speed of the variable speed motor 71, and to reduce a load on the variable speed motor 71 in this case.

In the above embodiment, when the brake 39 is provided in the transmission device 10*a* and the direction of current to be supplied to the variable speed motor 71 is changed, the rotation of the variable speed input shaft Av connected to the variable speed motor 71 is temporarily restrained by the brake 39. However, when the brake 39 is not provided in the transmission device 10*a* and the direction of current to be supplied to the variable speed motor 71 is changed, the rotation of the variable speed input shaft Av connected to the variable speed motor 71 may not be restrained. However, in this case, a load on the variable speed motor 71 when the direction of current to be supplied to the variable speed motor 71 is changed increases, unlike the case of this embodiment.

<Modification Example>

A modification example of each embodiment of the rotational driving force imparting device described above will be described.

In the rotational driving force imparting device of each embodiment, a driving target is the compressor C, and the compressor C is rotated at a high speed of 7500 rpm or more. In the rotational driving force imparting device of each embodiment, a rotational speed of the constant speed motor 51 is increased by the transmission device 10 or 10*a* to rotate the driving target at high speed as above. Therefore, in the transmission device 10 or 10*a* of each embodiment, the sun gear shaft 12 is the output shaft Ao, the internal gear carrier shaft 37 is the constant speed input shaft Ac, and the input-side planetary gear carrier shaft 27*i* is the variable speed input shaft Av.

However, the transmission device of the rotational driving force transmission device according to the present invention may be intended to decrease, for example, a rotational speed of the constant speed motor 51. In this case, the sun gear shaft 12 may be the constant speed input shaft Ac, the planetary gear carrier shaft 27 may be the variable speed input shaft Av, and the internal gear carrier shaft 37 may be the output shaft Ao. Further, for example, the sun gear shaft 12 may be the output shaft Ao, the internal gear carrier shaft 37 may be the variable speed input shaft Av, and the planetary gear carrier shaft 27 may be the constant speed input shaft Ac, similar to the above embodiment. It is appropriately set which any one of the sun gear shaft 12, the planetary gear carrier shaft 27, and the internal gear carrier shaft 37 is the output shaft Ao, which other shaft is the constant speed input shaft Ac, and which other axis is the variable speed input shaft Av as described above according to whether or not an output is increased relative to an input or to a rate of change of an increase or decrease of the output.

As described above, even when which of any one of the sun gear shaft 12, the planetary gear carrier shaft 27, and the internal gear carrier shaft 37 is the output shaft Ao, which other shaft is the constant speed input shaft Ac, and which other axis is the variable speed input shaft Av, it is possible to achieve miniaturization and reduction in a manufacturing cost of the device by coaxially arranging the constant speed rotor 52 connected to the constant speed input shaft Ac and the variable speed rotor 72 connected to the variable speed input shaft Av, similar to in the above embodiments.

Further, in each of the embodiments, a four-pole induction motor is illustrated as the constant speed motor 51 suitable to rotate the compressor C at high speed, and a 12-pole induction motor is illustrated as the variable speed motor 71 suitable to change a rotational speed of the compressor C within a certain range. However, when it is not necessary for the driving target to be rotated at high speed, another type of motor may be used as the constant speed motor 51 or the variable speed motor 71.

Further, in the above embodiments, the variable speed rotor 72 in which the shaft insertion hole 74 is formed forms the first rotor, and the constant speed rotor 52 inserted into the shaft insertion hole 74 forms the second rotor. However, when the shaft insertion hole is formed in the constant speed rotor and the variable speed rotor is inserted into the shaft insertion hole, the constant speed rotor forms the first rotor, and the variable speed rotor forms the second rotor.

Further, in each of the embodiments, the variable speed flexible coupling 95 that connects the variable speed rotor 72 to the variable speed input shaft Av forms the first flexible coupling, and the constant speed flexible coupling 97 that connects the constant speed rotor 52 to the constant speed input shaft Ac forms the second flexible coupling. However, when the constant speed flexible coupling is arranged on the outer circumferential side of the variable speed flexible coupling, the constant speed flexible coupling forms the first flexible coupling, and the variable speed flexible coupling forms the second flexible coupling.

INDUSTRIAL APPLICABILITY

In one aspect of the present invention, it is possible to achieve miniaturization and reduction in a manufacturing cost of the device.

REFERENCE SIGNS LIST

10, 10a: Transmission device (planetary gear transmission device)
11: Sun gear
12: Sun gear shaft
15: Planet gear
17: Internal gear
21: Planet gear carrier
22: Planet gear shaft
23: Carrier body
27: Planet gear carrier shaft
27i: Input-side planetary gear carrier shaft
28: Flange (transmission device-side connection portion)
29: Brake disc
31: Internal gear carrier
33: Carrier body
37: Internal gear carrier shaft
38: Flange
39: Brake
41: Transmission casing
50: Electric motor device
51: Constant speed motor
52: Constant speed rotor
53: Constant speed rotor shaft
54: Constant speed rotor body shaft
55: Constant speed rotor extension shaft
56: Conductor
61: Constant speed motor casing
62: Casing body
63i, 63o: Lid
64: Opening
66: Constant speed stator
71: Variable speed motor
72: Variable speed rotor
73: Variable speed rotor shaft
73o: Flange (rotor-side connection portion)
74: Shaft insertion hole
76: Conductor
81: Constant speed motor casing
82: Casing body
83i, 83o: Lid
84: Opening
86: Constant speed stator
91: Cooling fan
Ar: Shaft line
Ao: Output shaft
Ac: Constant speed input shaft
Av: Variable speed input shaft
100, 100a: Frequency conversion device
111: First switch
112: Second switch
120, 120a: Controller

The invention claimed is:

1. A rotational driving force imparting device, comprising:
an electric motor device configured to generate a rotational driving force; and
a transmission device configured to transmit the rotational driving force generated by the electric motor device to a driving target and change a rotational speed, wherein the transmission device includes
a sun gear that rotates about a shaft line;
a sun gear shaft that is fixed to the sun gear and extends in an axial direction about the shaft line;
a planetary gear that is engaged with the sun gear, revolves about the shaft line, and rotates about its own center line;
an internal gear in which a plurality of teeth are annularly aligned about the shaft line and are engaged with the planetary gear;
a planetary gear carrier that includes a planetary gear carrier shaft extending in the axial direction about the shaft line, and supports the planetary gear so that the planetary gear is revolvable about the shaft line and rotatable about the center line of the planetary gear; and
an internal gear carrier that includes an internal gear carrier shaft extending in the axial direction about the shaft line and supports the internal gear so that the internal gear is rotatable about the shaft line,
any one of the sun gear shaft, the planetary gear carrier shaft, and the internal gear carrier shaft forms an output shaft that is connected to the driving target, one of the sun gear shaft, the planetary gear carrier shaft, and the internal gear carrier shaft which is not the output shaft forms a constant speed input shaft, and one of the sun gear shaft, the planetary gear carrier shaft, and the internal gear carrier shaft which is not the output shaft and the constant speed input shaft forms a variable speed input shaft, the electric motor device includes
a constant speed motor including a constant speed rotor that rotates about the shaft line and is directly or indirectly connected to the constant speed input shaft of the transmission device; and
a variable speed motor including a variable speed rotor that rotates about the shaft line and is directly or indirectly connected to the variable speed input shaft of the transmission device,
a shaft insertion hole forming a cylindrical shape about the shaft line and penetrating in the axial direction is formed in a first rotor among the constant speed rotor and the variable speed rotor, and a portion of a second rotor is inserted into the shaft insertion hole of the first rotor, and
the rotational driving force imparting device further comprises:
a frequency conversion device that changes a frequency of power that is supplied to the variable speed motor;
a first switch that causes the constant speed motor to enter a first power supply state and a first power disconnection state;
a second switch that causes the variable speed motor to enter a second power supply state and a second power disconnection state; and
a controller that instructs a frequency of power that is supplied to the variable speed motor to the frequency conversion device and instructs the first switch and the second switch to be turned ON or OFF.

2. The rotational driving force imparting device according to claim 1, comprising:
a constant speed flexible coupling that connects the constant speed rotor to the constant speed input shaft; and
a variable speed flexible coupling that connects the variable speed rotor to the variable speed input shaft.

3. The rotational driving force imparting device according to claim 2,
wherein the flexible coupling connected to the first rotor among the constant speed flexible coupling and the variable speed flexible coupling forms a first flexible coupling,
an input shaft that is rotated with rotation of the first rotor among the constant speed input shaft and the variable speed input shaft forms a first input shaft,
a rotor-side connection portion that forms an annular shape about the shaft line and is connected to the first flexible coupling is formed in an end portion of the first rotor on the transmission device side, and
a transmission device-side connection portion that forms an annular shape about the shaft line and is connected to the first flexible coupling to be opposite to the rotor-side connection portion in the axial direction is formed at an end portion of the first input shaft on the electric motor device side.

4. The rotational driving force imparting device according to claim 2,
wherein the flexible coupling connected to the first rotor among the constant speed flexible coupling and the variable speed flexible coupling forms a first flexible coupling, and the flexible coupling connected to the second rotor forms a second flexible coupling,
the first flexible coupling is arranged on an outer circumferential side of the second flexible coupling on the basis of the shaft line, and
a length in the axial direction of the second flexible coupling is equal to or smaller than a length in the axial direction of the first flexible coupling.

5. The rotational driving force imparting device according to claim 1,
wherein the constant speed motor includes a constant speed stator arranged on an outer circumferential side of the constant speed rotor, and a constant speed motor casing in which the constant speed stator is fixed to an inner circumferential side thereof,
the variable speed motor includes a variable speed stator arranged on an outer circumferential side of the variable speed rotor, and a variable speed motor casing in which the variable speed stator is fixed to an inner circumferential side thereof, and
the variable speed motor casing is fixed to the constant speed motor casing.

6. The rotational driving force imparting device according to claim 5, comprising:
a cooling fan attached to an end portion of the second rotor opposite to the transmission device,
wherein the constant speed motor casing and the variable speed motor casing communicate with each other so that gas flow occurs due to rotation of the cooling fan in the constant speed motor casing and the variable speed motor casing.

7. The rotational driving force imparting device according to claim 1,
wherein the sun gear shaft forms the output shaft, the planetary gear carrier shaft forms the variable speed input shaft, and the internal gear carrier shaft forms the constant speed input shaft, and
when the controller receives a startup instruction, the controller instructs the second switch to be turned ON so that the variable speed motor enters the second power supply state, instructs a predetermined frequency which is a minimum frequency that can be set by the frequency conversion device or a minimum frequency set in advance by an operator to the frequency conversion device so that the variable speed motor begins to be driven with a rotational speed corresponding to the predetermined frequency, and then, instructs the first switch to be turned ON so that the constant speed motor enters the first power supply state.

8. The rotational driving force imparting device according to claim 1,
wherein the frequency conversion device is a reversible frequency conversion device capable of changing a direction of a current that is supplied to the variable speed motor, and
the controller is configured to:
determine whether it is necessary to change the direction of the current that is supplied to the variable speed motor in order to realize a rotational speed after a rotational speed of the output shaft is changed when a change of a rotational speed of the output shaft is received;
instruct the second switch to be turned OFF to cause the variable speed motor to enter the second power disconnection state when it is determined that it is necessary to change the direction of the current that is supplied to the variable speed motor;
instruct the second switch to be turned ON to cause the variable speed motor to enter the second power supply state and instruct the frequency conversion device to change the direction of the current that is supplied to the variable speed motor after the variable speed motor enters the second power disconnection state; and instruct a frequency necessary to realize a rotational speed after the change of a rotational speed of the output shaft as a frequency of the power that is supplied to the variable speed motor after the variable speed motor begins to be reversely rotated and driven due to the change of the direction of the current that is supplied to the variable speed motor.

9. The rotational driving force imparting device according to claim 8,
wherein the transmission device includes a brake that restrains the variable speed input shaft so that the variable speed input shaft is not rotatable, and
the controller is configured to instruct the brake to restrain the variable speed input shaft after the variable speed motor enters the second power disconnection state, and then instruct the brake to release of the restraint of the variable speed input shaft before reversely rotating and driving the variable speed motor.

10. The rotational driving force imparting device according to claim 8,
wherein the controller is configured to:
instruct a predetermined frequency which is a minimum frequency that can be set by the frequency conversion device or a minimum frequency set in advance by an operator to the frequency conversion device as a frequency of the power to be supplied to the variable speed motor before causing the variable speed motor to enter the second power disconnection state when it is determined that it is necessary to change the direction of the current that is supplied to the variable speed motor; and
instruct the predetermined frequency as a frequency of the power that is supplied to the variable speed motor after the variable speed motor enters the second power disconnected state and before instructing a frequency necessary to realize a rotational speed after the change of a rotational speed of the output shaft as a frequency of the power that is supplied to the variable speed motor after the variable speed motor begins to be reversely rotated and driven due to the change of the direction of the current that is supplied to the variable speed motor.

11. The rotational driving force imparting device according to claim 1,
wherein the sun gear shaft forms the output shaft,
the planetary gear carrier shaft forms the variable speed input shaft, and
the internal gear carrier shaft forms the constant speed input shaft.

12. A rotational driving force imparting device, comprising:
a transmission device including an output shaft that is connected to a driving target, a constant speed input shaft that rotates at a constant speed, and a variable speed input shaft that rotates at variable speed, a rotational speed of the output shaft being determined according to a rotational speed of the variable speed input shaft and a rotational speed of the constant speed input shaft;
an electric motor device including a constant speed motor that rotates and drives the constant speed input shaft, and a variable speed motor that rotates and drives the variable speed input shaft;
a frequency conversion device that changes a frequency of power that is supplied to the variable speed motor;
a first switch that causes the constant speed motor to enter a first power supply state and a first power disconnection state;
a second switch that causes the variable speed motor to enter a second power supply state and a second power disconnection state; and
a controller that instructs a frequency of power that is supplied to the variable speed motor to the frequency conversion device and instructs the first switch and the second switch to be turned ON or OFF, wherein
the transmission device includes
a sun gear that rotates about a shaft line;
a sun gear shaft that is fixed to the sun gear and extends in an axial direction about the shaft line;
a planetary gear that is engaged with the sun gear, revolves about the shaft line, and rotates about its own center line;
an internal gear in which a plurality of teeth are annularly aligned about the shaft line and are engaged with the planetary gear;
a planetary gear carrier that includes a planetary gear carrier shaft extending in the axial direction about the shaft line, and supports the planetary gear so that the planetary gear is revolvable about the shaft line and rotatable about the center line of the planetary gear; and
an internal gear carrier that includes an internal gear carrier shaft extending in the axial direction about the shaft line and supports the internal gear so that the internal gear is rotatable about the shaft line,
the sun gear shaft forms the output shaft, the planetary gear carrier shaft forms the variable speed input shaft, and the internal gear carrier shaft forms the constant speed input shaft, and
when the controller receives a startup instruction, the controller instructs the second switch to be turned ON so that the variable speed motor enters the second power supply state, instructs a predetermined frequency which is a minimum frequency that can be set by the frequency conversion device or a minimum frequency set in advance by an operator to the frequency conversion device so that the variable speed motor begins to be driven with a rotational speed corresponding to the predetermined frequency, and then, instructs the first switch to be turned ON so that the constant speed motor enters the first power supply state.

13. A rotational driving force imparting device, comprising:
an electric motor device configured to generate a rotational driving force; and
a transmission device configured to transmit the rotational driving force generated by the electric motor device to a driving target and change a rotational speed, wherein
the transmission device includes
a sun gear that rotates about a shaft line;
a sun gear shaft that is fixed to the sun gear and extends in an axial direction about the shaft line;
a planetary gear that is engaged with the sun gear, revolves about the shaft line, and rotates about its own center line;
an internal gear in which a plurality of teeth are annularly aligned about the shaft line and are engaged with the planetary gear;
a planetary gear carrier that includes a planetary gear carrier shaft extending in the axial direction about the shaft line, and supports the planetary gear so that the planetary gear is revolvable about the shaft line and rotatable about the center line of the planetary gear; and
an internal gear carrier that includes an internal gear carrier shaft extending in the axial direction about the shaft line and supports the internal gear so that the internal gear is rotatable about the shaft line, any one of the sun gear shaft, the planetary gear carrier shaft, and the internal gear carrier shaft forms an output shaft that is connected to the driving target, one of the sun gear shaft, the planetary gear carrier shaft, and the internal gear carrier shaft which is not the output shah forms a constant speed input shaft, and one of the sun gear shaft, the planetary gear carrier shaft, and the internal gear carrier shaft which is not the output shaft and the constant speed input shaft forms a variable speed input shaft, the electric motor device includes a constant speed motor including a constant speed rotor that rotates about the shaft line and is directly or indirectly connected to the constant speed input shaft of the transmission device; and a variable speed motor including a variable speed rotor that rotates about the shaft line and is directly or indirectly connected to the variable speed input shaft of the transmission device, a shaft insertion hole forming a cylindrical shape about the shaft line and penetrating in the axial direction is formed in a first rotor among the constant speed rotor and the variable speed rotor, and a portion of a second rotor is inserted into the shaft insertion hole of the first rotor, and a number of poles of the variable speed motor is greater than the number of poles of the constant speed motor.

\* \* \* \* \*